(12) United States Patent
Imura et al.

(10) Patent No.: US 10,960,839 B2
(45) Date of Patent: Mar. 30, 2021

(54) OCCUPANT PROTECTION APPARATUS

(71) Applicant: HONDA MOTOR CO., LTD., Tokyo (JP)

(72) Inventors: Kazuo Imura, Wako (JP); Naotoshi Takemura, Wako (JP); Yoshihisa Sugamata, Wako (JP); Yusuke Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 16/494,077

(22) PCT Filed: Mar. 16, 2017

(86) PCT No.: PCT/JP2017/010701
§ 371 (c)(1),
(2) Date: Sep. 13, 2019

(87) PCT Pub. No.: WO2018/167919
PCT Pub. Date: Sep. 20, 2018

(65) Prior Publication Data
US 2020/0130627 A1    Apr. 30, 2020

(51) Int. Cl.
*B60R 21/015*        (2006.01)
*B60R 21/2338*       (2011.01)
(Continued)

(52) U.S. Cl.
CPC .......... *B60R 21/01554* (2014.10); *B60N 2/14* (2013.01); *B60N 2/143* (2013.01);
(Continued)

(58) Field of Classification Search
CPC ............ B60R 21/01554; B60R 21/015; B60R 21/0134; B60R 21/213; B60R 21/214;
(Continued)

(56) References Cited

U.S. PATENT DOCUMENTS 4,487,452 A * 12/1984 Tanizaki ................. B60N 2/242
                                                       248/415
6,113,132 A *  9/2000 Saslecov ................. B60R 21/20
                                                       280/730.1
(Continued)

FOREIGN PATENT DOCUMENTS

JP    2009-208566 A     9/2009
JP    2016-175513 A    10/2016

OTHER PUBLICATIONS

PCT/ISA/210 from International Application PCT/JP2017/010701 with the English translation thereof.

*Primary Examiner* — Keith J Frisby
(74) *Attorney, Agent, or Firm* — Carrier Blackman & Associates, P.C.; Joseph P. Carrier; William D. Blackman

(57) ABSTRACT

An occupant protection apparatus includes a seat arrangement determination unit that determines the arrangement of seats and a collision determination unit that determines information about collision occurring to a vehicle. A deployment control unit deploys an airbag when the direction of the seat and the direction of the seat determined by the scat arrangement determination unit (94) are opposed to each other, and the direction of the collision determined by the collision determination unit is on the front side of the seat, or on the front side of the seat.

20 Claims, 18 Drawing Sheets

(51) Int. Cl.
  *B60R 21/231* (2011.01)
  *B60N 2/14* (2006.01)
  *B60R 21/0134* (2006.01)
  *B60R 21/201* (2011.01)
  *B60R 21/213* (2011.01)
  *B60R 21/214* (2011.01)
  *B60R 21/00* (2006.01)
  *B60R 21/01* (2006.01)
  *B60R 21/217* (2011.01)

(52) U.S. Cl.
  CPC ........ *B60R 21/0134* (2013.01); *B60R 21/201* (2013.01); *B60R 21/213* (2013.01); *B60R 21/214* (2013.01); *B60R 21/231* (2013.01); *B60R 21/2338* (2013.01); *B60R 2021/0011* (2013.01); *B60R 2021/0032* (2013.01); *B60R 2021/01013* (2013.01); *B60R 2021/2173* (2013.01); *B60R 2021/23153* (2013.01); *B60R 2021/23161* (2013.01); *B60R 2021/23388* (2013.01)

(58) Field of Classification Search
  CPC . B60R 21/2338; B60R 21/231; B60R 21/232; B60R 2021/0032; B60R 2021/01013; B60R 2021/23388; B60R 2021/23386; B60R 2021/23161; B60R 2021/23107; B60R 2021/23153; B60R 2021/23192; B60R 2021/2173; B60R 2021/2175; B60R 2021/0011; B60N 2/14; B60N 2/01; B60N 2/143; B60N 2/0292; B60N 2002/022
  USPC .............................. 280/735, 730.1; 297/240
  See application file for complete search history.

(56) References Cited

U.S. PATENT DOCUMENTS

| | | | | |
|---|---|---|---|---|
| 8,534,735 | B2* | 9/2013 | McManus | B62D 47/003 296/26.08 |
| 9,725,064 | B1* | 8/2017 | Faruque | B60N 2/143 |
| 9,821,697 | B2* | 11/2017 | Jaradi | B60N 3/008 |
| 10,414,294 | B2* | 9/2019 | Barbot | B60N 2/225 |
| 10,647,286 | B1* | 5/2020 | Dennis | B60R 21/18 |
| 2005/0253433 | A1* | 11/2005 | Brown | B60N 2/203 297/283.3 |
| 2012/0133114 | A1* | 5/2012 | Choi | B60R 21/214 280/728.2 |
| 2015/0258954 | A1* | 9/2015 | Engelman | B60R 21/01556 280/735 |
| 2016/0272141 | A1 | 9/2016 | Ohmura | |
| 2018/0215338 | A1* | 8/2018 | Faruque | B60R 21/214 |
| 2018/0229681 | A1* | 8/2018 | Jaradi | B60R 21/237 |

* cited by examiner

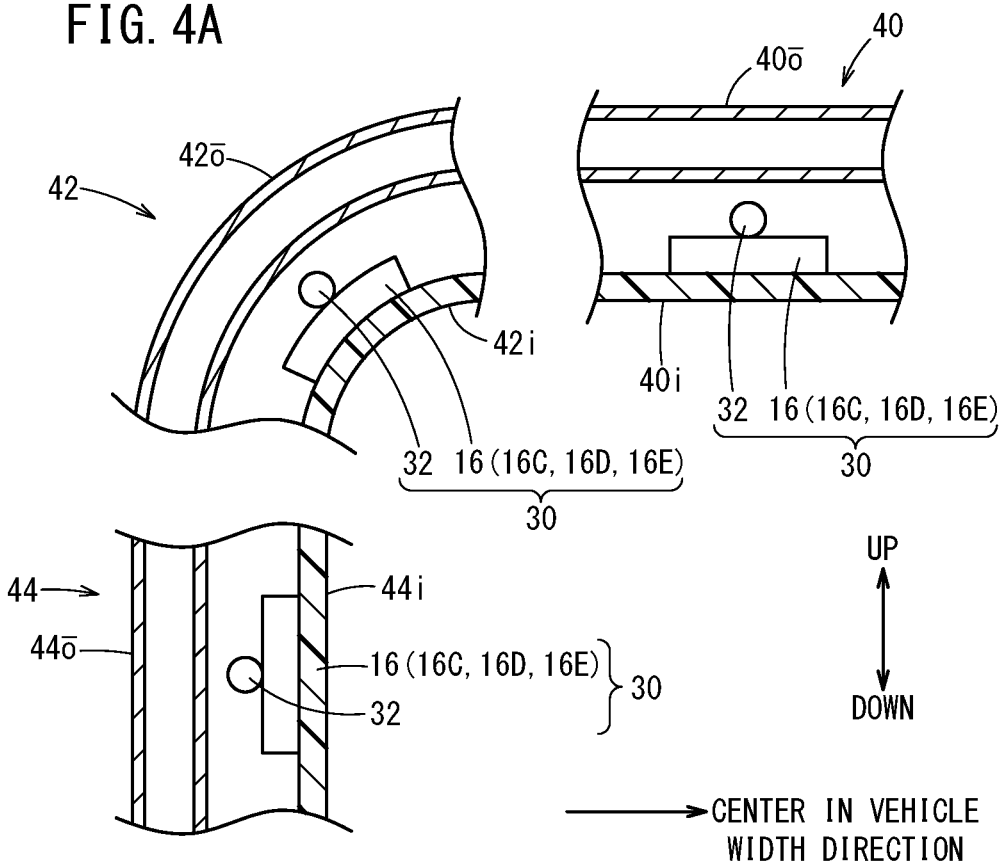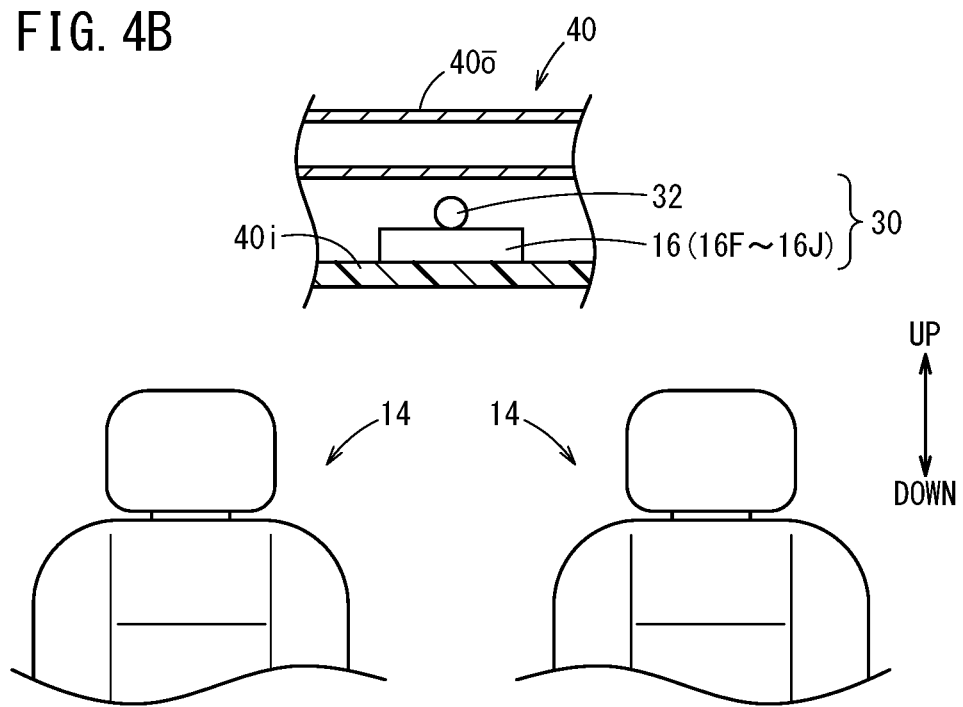

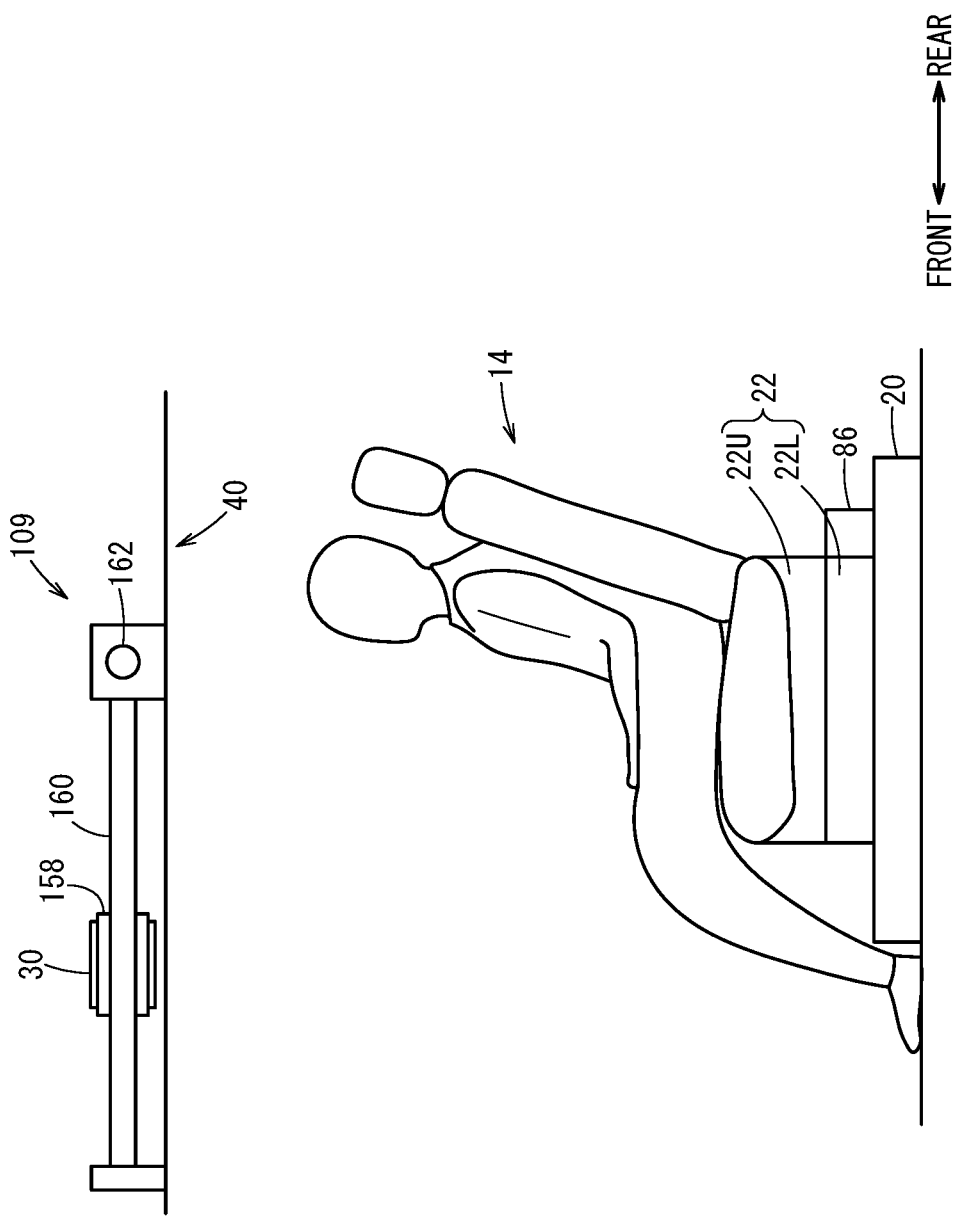

OCCUPANT PROTECTION APPARATUS

TECHNICAL FIELD

The present invention relates to a vehicle occupant protection device (occupant protection apparatus) that protects a vehicle occupant by deploying an air bag toward a front side of the vehicle occupant when a collision of a vehicle occurs.

BACKGROUND ART

In recent years, a vehicle in which a disposition (position or direction) of a seat is changed freely has been examined in order to improve the flexibility in a vehicle compartment for a vehicle occupant. If the disposition of the seat is changed, the vehicle occupant needs to be protected in accordance with the changed disposition when a collision of the vehicle occurs. Japanese Laid-Open Patent Publication No. 2016-175513 discloses a vehicle occupant protection device that changes an operation of an air bag and a seat belt in accordance with the direction of a driver's seat and a passenger seat.

SUMMARY OF INVENTION

In a technique in Japanese Laid-Open Patent Publication No. 2009-208566, only a driver's seat and a passenger seat are assumed and seats behind these front seats are not considered. Moreover, when the collision occurs in a state where the driver's seat or the passenger seat faces backward, further improvement is required for protection of the front side of the vehicle occupant who faces backward.

The present invention has been made in view of the above problem, and an object is to provide a vehicle occupant protection device that can appropriately protect a vehicle occupant in accordance with a disposition of a seat.

A vehicle occupant protection device according to the present invention includes: an air bag configured to be deployed between two seats that are adjacent to each other; a deployment control unit configured to deploy the air bag; a seat disposition determination unit configured to determine directions of the two seats; and a collision determination unit configured to determine information about a collision of a vehicle, wherein if the direction of one of the seats and the direction of another of the seats that are determined by the seat disposition determination unit face each other, and if a direction of the collision that is determined by the collision determination unit is on a front side of the one seat or a front side of the other seat, the deployment control unit deploys the air bag.

By the above structure, if the two seats face each other, and if the collision occurs so that a vehicle occupant moves from the one seat toward the other seat or the collision occurs so that the vehicle occupant moves from the other seat toward the one seat, the air bag is deployed between the two seats. Thus, one air bag can appropriately protect both the vehicle occupants who are seated on the seats that face each other.

Moreover, a vehicle occupant protection device according to the present invention includes: an air bag configured to be deployed between a rearmost seat in a vehicle compartment and a rear end of the vehicle compartment; a deployment control unit configured to deploy the air bag; a seat disposition determination unit configured to determine a direction of the seat; and a collision determination unit configured to determine information about a collision of a vehicle, wherein if the direction of the seat that is determined by the seat disposition determination unit is a rear direction of the vehicle, and if a direction of the collision that is determined by the collision determination unit is on a rear side of the vehicle, the deployment control unit deploys the air bag.

By the above structure, if the rearmost seat faces in the rear direction and the collision occurs so that the vehicle occupant moves from the rearmost seat toward the rear end of the vehicle compartment, the air bag is deployed between the rearmost seat and the rear end of the vehicle compartment. Thus, the vehicle occupant who is seated on the rearmost seat and faces in the rear direction can be appropriately protected.

The air bag may be configured to be deployed from a roof in a downward direction of the vehicle.

By the above structure, an air bag unit is provided to the wide roof. Thus, a position at which the air bag unit is disposed can be more freely selected. In addition, the air bag unit can be disposed between the seats individually.

The air bag may be configured to be deployed from a roof side rail or a pillar toward a center in a vehicle width direction.

By the above structure, a variation of the position at which the air bag is disposed increases. Thus, the position at which the air bag is disposed can be more freely selected.

The vehicle occupant protection device according to the present invention may further include a first strap and a second strap, each having one end fixed to the air bag and another end fixed to the roof, wherein a fixing part for the deployed air bag and the first strap may be positioned above a fixing part for the deployed air bag and the second strap.

By the above structure, the first strap and the second strap can apply reaction force to the air bag.

The vehicle occupant protection device according to the present invention may further include: a vehicle occupant determination unit configured to determine a physique of a vehicle occupant; and a tension control unit configured to control tensions of the first strap and the second strap on a basis of the physique of the vehicle occupant that is determined by the vehicle occupant determination unit and/or impact of the collision that is determined by the collision determination unit.

By the above configuration, the appropriate reaction force can be applied to the air bag in accordance with the impact of the collision or the size of the vehicle occupant.

At least one of the first strap and the second strap may be connected to an energy absorption member.

By the above structure, force applied to the vehicle occupant from the air bag can be reduced.

The vehicle occupant protection device according to the present invention may further include a sheet member configured to extend between the second strap and the roof.

By the above structure, if the vehicle occupant moves toward the second strap, the vehicle occupant can be supported by the sheet member in addition to the second strap. Thus, force applied to the vehicle occupant from the second strap can be reduced.

The vehicle occupant protection device according to the present invention may further include: a timer configured to start time measuring when the air bag starts to be deployed; a strap cutting device configured to cut the first strap and the second strap from the roof in accordance with a cutting instruction; and a cutting instruction unit configured to output the cutting instruction to the strap cutting device if a time measured by the timer has exceeded a predetermined time.

By the above structure, after the predetermined time has passed, the vehicle occupant can move smoothly.

The vehicle occupant protection device according to the present invention may further include: a seat support mechanism configured to support the seat in a state where the seat is movable in a horizontal direction; and an air bag movement device configured to move the air bag in accordance with a movement operation of the seat.

By the above structure, a deployment area of the air bag can be set to an appropriate position in accordance with the position of the seat.

The vehicle occupant protection device according to the present invention may further include a monitor device protruding from the roof in the downward direction of the vehicle, wherein when the air bag is deployed, the air bag may be disposed at a position where the air bag is in contact with the monitor device.

By the above structure, the monitor device can apply the reaction force to the air bag.

BRIEF DESCRIPTION OF DRAWINGS

FIG. 4A and FIG. 4B are disposition diagrams that illustrate an air bag unit when viewed from a front direction of the vehicle;

FIG. 18 is a schematic diagram that illustrates an air bag movement device.

DESCRIPTION OF EMBODIMENTS

Preferred embodiments of a vehicle occupant protection device according to the present invention are hereinafter described with reference to the attached drawings. Note that in the description below, front and rear refer to a front-rear direction of a vehicle 10 (FIG. 1), left and right refer to a left-right direction in a vehicle width direction, and up and down refer to a vertical direction of the vehicle 10, unless otherwise stated.

The present invention can be applied to an automated driving vehicle and a manual driving vehicle. Automated driving herein described refers to a concept that includes not just "fully automated driving" in which travel control of the vehicle 10 is fully automated but also "partially automated driving" or "driving assistance" in which the travel control of the vehicle 10 is partially automated. In the vehicle 10 that is assumed in the present specification, each of driving force control, braking control, and steering control is switched between automated control and manual control.

[1. Vehicle 10]

Figure 1:
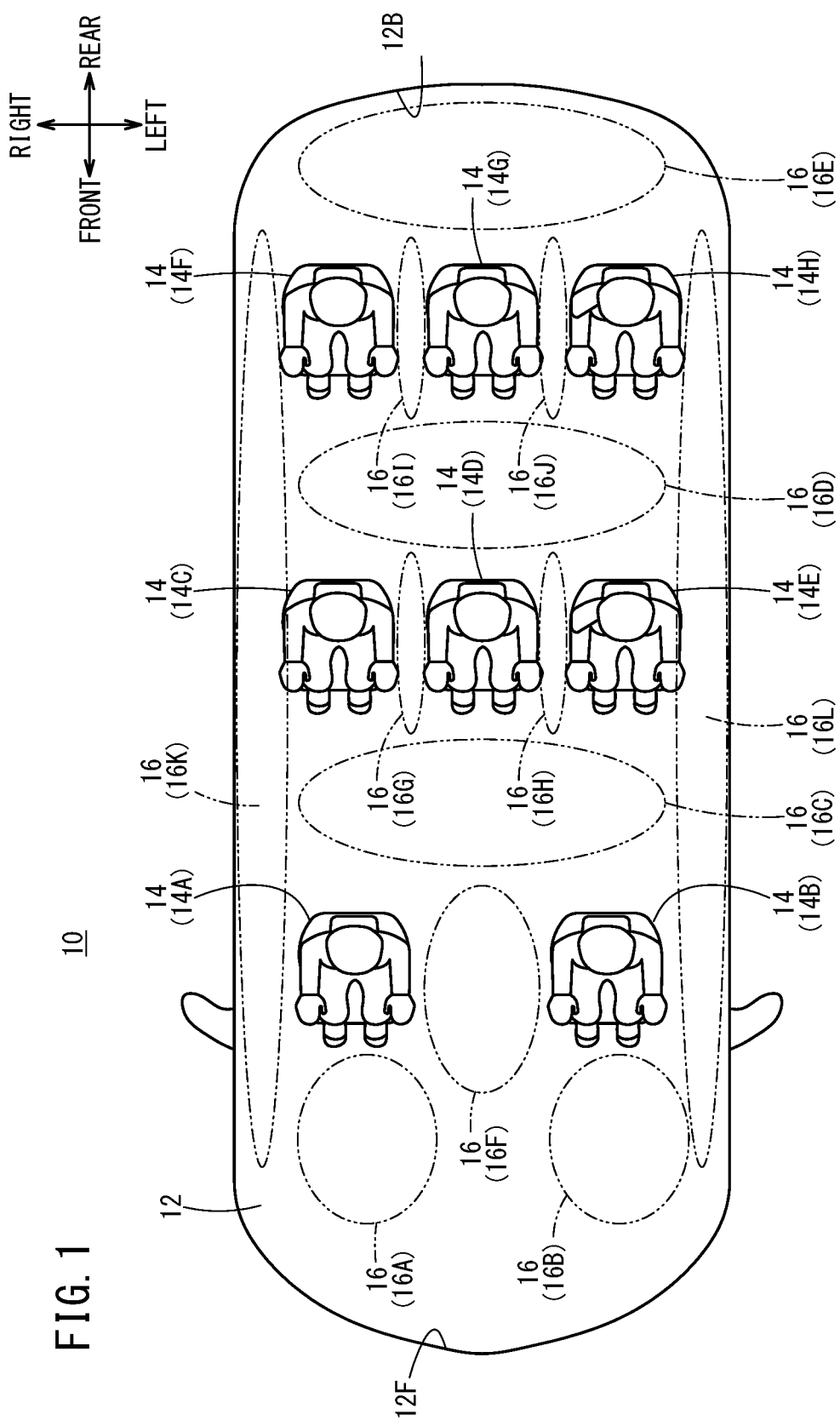
FIG. 1 is a disposition diagram that illustrates seats in a vehicle compartment and deployed air bags.

As illustrated in FIG. 1, in a vehicle compartment 12 of the vehicle 10, a plurality of seats 14 where the vehicle occupants are seated are provided. The seats 14 that are assumed here include two seats 14A, 14B disposed in a first row, three seats 14C to 14E disposed in a second row, and three seats 14F to 14H disposed in a third row. Moreover, in the vehicle 10, a plurality of air bags 16 are deployed in different areas individually. The air bags 16 that are assumed here include: an air bag 16A that is deployed between the seat 14A and a front end 12F of the vehicle compartment; an air bag 16B that is deployed between the seat 14B and the front end 12F of the vehicle compartment; an air bag 16C that is deployed between the seat 14A and the seat 14B, and the seats 14C to 14E in the second row; an air bag 16D that is deployed between the seats 14C to 14E in the second row and the seats 14F to 14H in the third row; an air bag 16E that is deployed between the seats 14F to 14H in the third row and a rear end 12B of the vehicle compartment; an air bag 16F that is deployed between the seat 14A and the seat 14B; an air bag 16G that is deployed between the seat 14C and the seat 14D in the second row; an air bag 16H that is deployed between the seat 14D and the seat 14E in the second row; an air bag 16I that is deployed between the seat 14F and the seat 14G in the third row; an air bag 16J that is deployed between the seat 14G and the seat 14H in the third row; an air bag 16K that is deployed on a right end of the vehicle compartment 12; and an air bag 16L that is deployed on a left end of the vehicle compartment 12.

[2. Seat 14]

Figure 2:
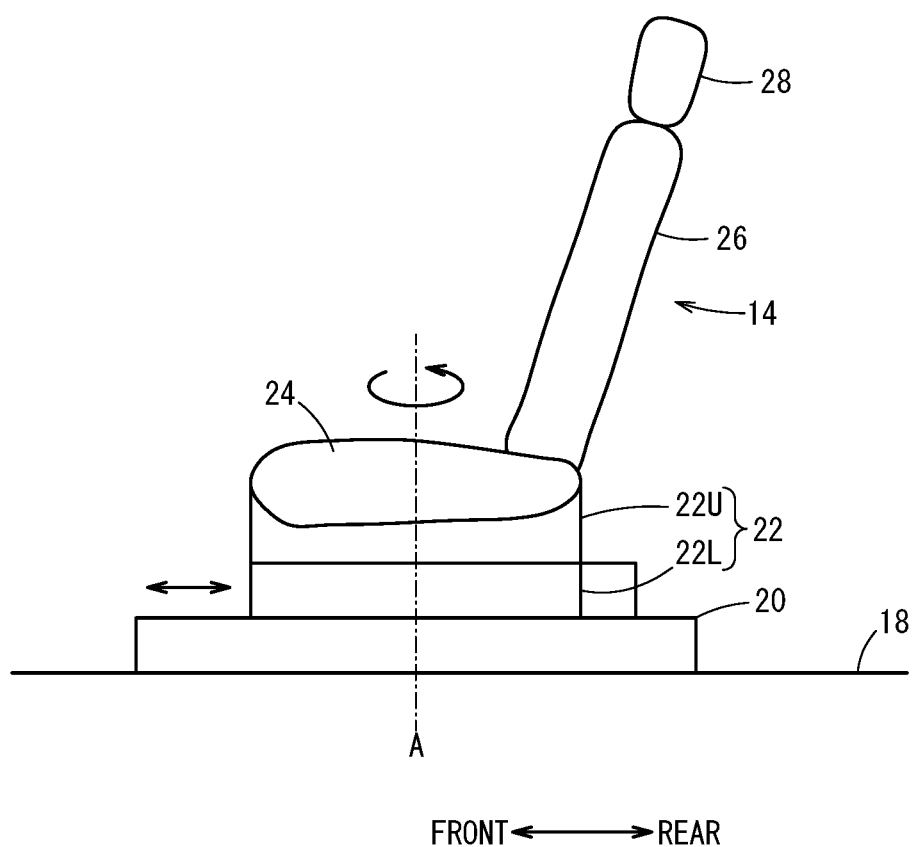
FIG. 2 is a schematic side view that illustrates a seat.

As illustrated in FIG. 2, to a floor panel 18 of the vehicle compartment 12, a plurality of rails 20 that are parallel to the front-rear direction of the vehicle 10 are attached. The seat 14 includes a base 22, a seat cushion 24, a seat back 26, and a headrest 28. The base 22 is supported in a state where the base 22 is movable in the front-rear direction of the vehicle 10 along the rail 20. The seat cushion 24 is fixed to an upper part of the base 22. The seat back 26 extends upward from a rear end of the seat cushion 24. The headrest 28 is fixed to an upper end of the seat back 26. The base 22 includes a base lower part 22L that is movable along the rail 20, and a base upper part 22U to which the seat cushion 24 is fixed. The base upper part 22U can rotate with respect to the base lower part 22L about an axis A that is parallel to a direction that is approximately perpendicular to the floor panel 18. Thus, a front surface of the seat back 26 of the seat 14 can be turned to the front, rear, left, or right direction. A direction to which the front surface of the seat back 26 faces is referred to as a direction of the seat 14 or an orientation of the seat 14. The direction of the seat 14 is defined based on the front-rear direction and the left-right direction of the vehicle 10.

Specific examples of the direction of the seat 14 are described with reference to FIG. 3A to FIG. 3C. Here, the examples including the seats 14C and 14D in the second row and the seat 14G in the third row are described. However, the direction of each seat 14 can be changed similarly.

Figure 3A:
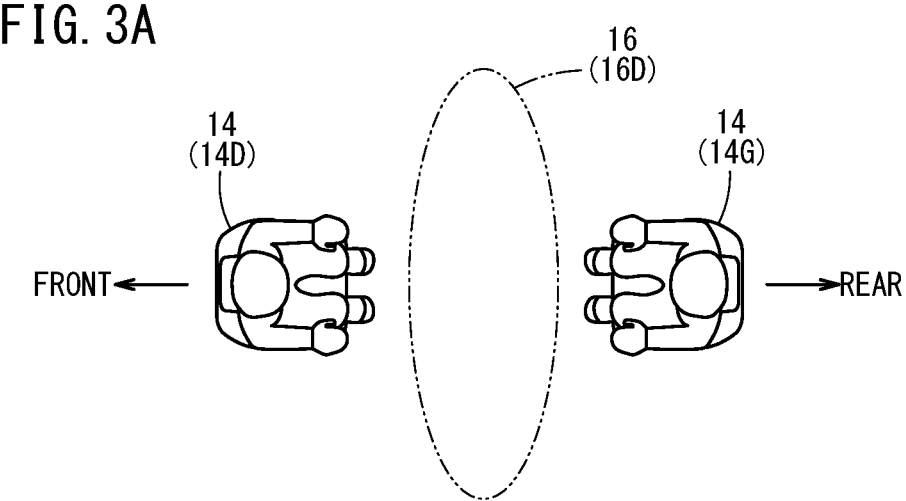
FIG. 3A, 3B, and FIG. 3C are explanatory diagrams that illustrate directions of the seats.

As illustrated in FIG. 3A, if the seat 14D in the second row is turned by 180 degrees using the axis A as the center, the front surface of the seat back 26 faces in the rear direction of the vehicle 10. In this state, "the direction of the seat 14D is the rear direction". At this time, if the direction of the seat 14G in the third row is the front direction, the seat 14D and the seat 14G face each other.

Figure 3B:
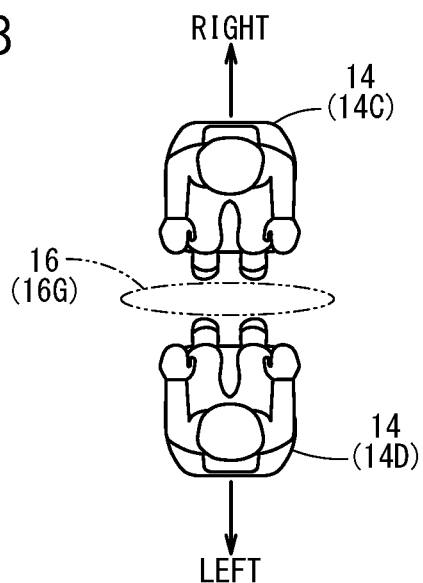

As illustrated in FIG. 3B, if the seat 14D in the second row is turned to the right direction by 90 degrees using the axis A as the center, the front surface of the seat back 26 faces in the right direction of the vehicle 10. In this state, "the direction of the seat 14D is the right direction". At this time, if the direction of the seat 14C in the same second row is the left direction, the seat 14D and the seat 14C face each other.

Figure 3C:
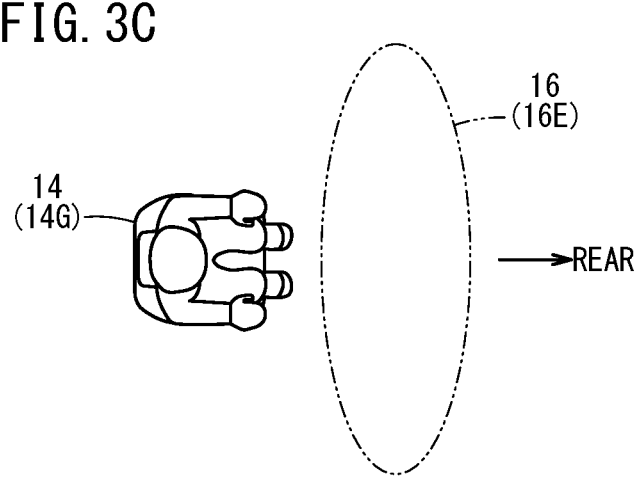

As illustrated in FIG. 3C, if the seat 14G in the third row is turned by 180 degrees using the axis A as the center, the direction of the seat 14G is the rear direction. At this time, the seat 14G faces the rear end 12B of the vehicle compartment.

[3. Air Bag Unit 30]

An air bag unit 30 (FIG. 4A, FIG. 4B) includes the air bag 16 and a gas supply device 32. The air bag 16 is a fabric made of a chemical fiber. As illustrated in FIG. 1, each air bag 16 is woven so as to have a shape that is deployed in a predetermined area in the vehicle compartment 12, and a direction of the deployment is adjusted in advance. The gas supply device 32 generates gas in accordance with a gas generation instruction that is output from an air bag ECU 66 (FIG. 5), and supplies the air bag 16 with the generated gas.

The air bag unit 30 that includes the air bag 16A is provided to a steering wheel (not shown). The air bag unit 30 that includes the air bag 16B is provided to a dashboard (not shown). The air bags 16A, 16B are deployed toward the seats 14A, 14B.

As illustrated in FIG. 4A, the air bag unit 30 that includes the air bag 16C is provided to any one of a roof 40, a roof side rail 42, and a pillar 44 (B pillar). Similarly, each air bag unit 30 that includes the air bag 16D, 16E is provided to any one of the roof 40, the roof side rail 42, and the pillar 44 (C pillar, D pillar). The roof 40, the roof side rail 42, and the pillar 44 include an outer member 40$o$, 42$o$, 44$o$ that is formed by connecting metal plates or the like and an inner member 40$i$, 42$i$, 44$i$ that is made of resin or the like, respectively. The air bag unit 30 is provided between the outer member 40$o$, 42$o$, 44$o$ and the inner member 40$i$, 42$i$, 44$i$. If the air bag unit 30 is provided to the roof 40, the air bag 16C to 16E is deployed in the downward direction of the vehicle 10. If the air bag unit 30 is provided to the roof side rail 42 or the pillar 44, the air bag 16C to 16E is deployed toward the center in the vehicle width direction.

As illustrated in FIG. 4B, the air bag unit 30 that includes the air bag 16F is provided between the outer member 40$o$ and the inner member 40$i$ of the roof 40 that is positioned above between two seats 14 that are adjacent to each other along the vehicle width direction. Similarly, each air bag unit 30 that includes the air bag 16G to 16J is provided between the outer member 40$o$ and the inner member 40$i$ of the roof 40 that is positioned above between two seats 14 that are adjacent to each other along the vehicle width direction. The air bag 16G to 16J is deployed in the downward direction of the vehicle 10.

The air bag unit 30 that includes the air bag 16K, 16L is provided between the outer member 42$o$ and the inner member 42$i$ of the roof side rail 42. The air bag 16K, 16L is deployed in the downward direction of the vehicle 10 along a side window (not shown).

[4. System Configuration of Vehicle 10]

Figure 5:
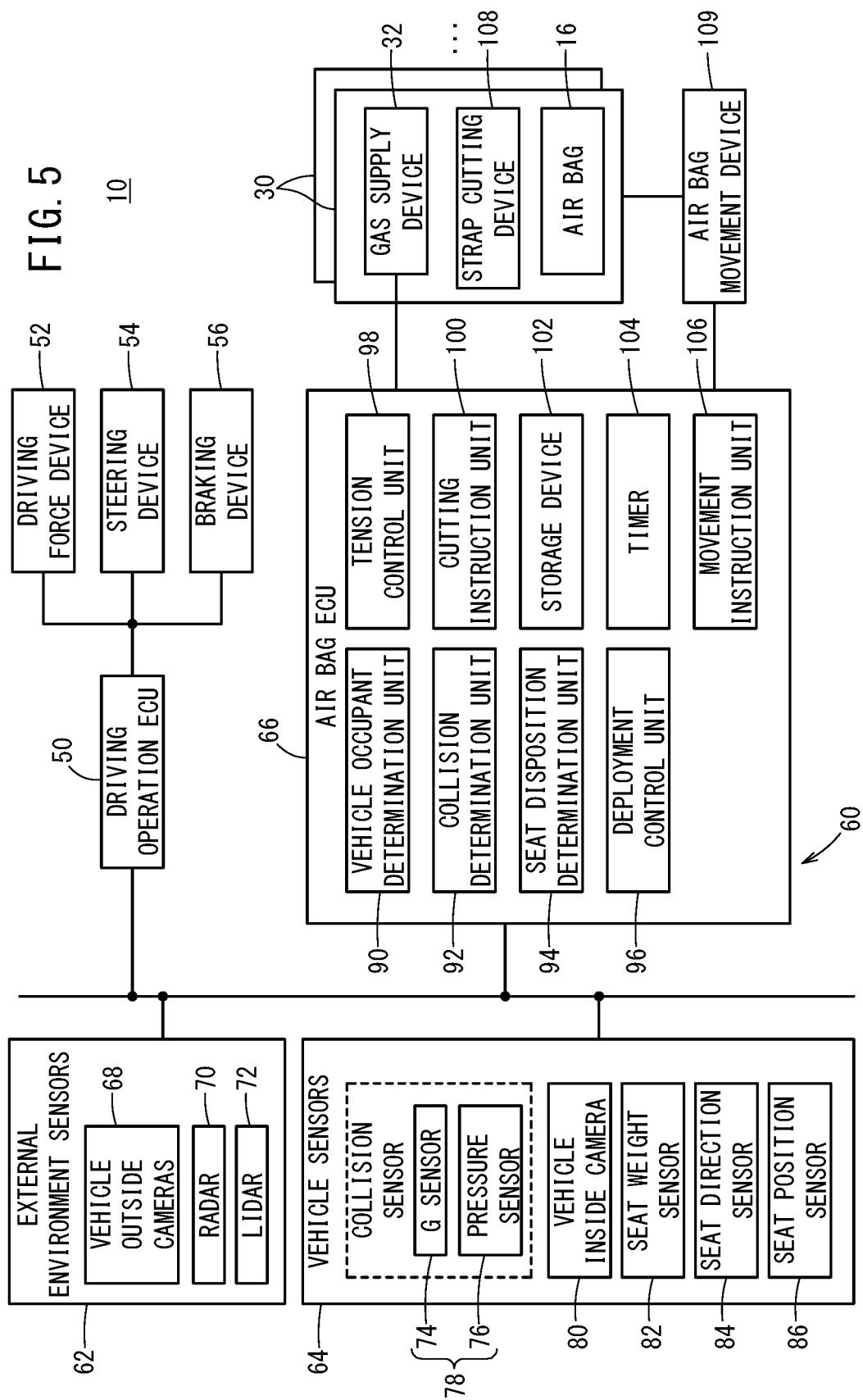
FIG. 5 is a block diagram of the vehicle that includes a vehicle occupant protection device.

A system configuration of the vehicle 10 is described with reference to FIG. 5. As described above, the vehicle 10 according to the present embodiment can be switched between the automated control and the manual control. A system configuration regarding the automated driving and a system configuration of a vehicle occupant protection device 60 are hereinafter described individually.

[4.1. System Configuration Regarding Automated Driving]

The vehicle 10 includes a driving operation ECU 50, and a driving force device 52, a steering device 54, and a braking device 56 that are controlled by the driving operation ECU 50. The driving operation ECU 50 is configured by one or a plurality of ECUs, and includes a storage device and various function achievement units. Each of the function achievement units is a software function unit in which a function is achieved when a CPU (central processing unit) executes programs stored in the storage device. Note that the function achievement unit can be achieved by a hardware function unit that includes an integrated circuit such as an FPGA (Field-Programmable Gate Array). The function achievement unit(s) of the air bag ECU 66 to be described below can also be achieved by such a hardware function unit. In the automated driving, the driving operation ECU 50 acquires information that is necessary for the automated driving from external environment sensors 62, vehicle sensors 64, and the like to be described below, recognizes external environment information and host vehicle information, creates an action plan, and outputs to the driving force device 52, the steering device 54, and the braking device 56, a control instruction in order to travel in accordance with the action plan.

The driving force device 52 includes a driving force ECU and a driving source including an engine or traction motor, and performs an acceleration/deceleration operation in accordance with the control instruction that is output from the driving operation ECU 50. The steering device 54 includes an EPS (electric power steering system) ECU and an EPS actuator, and performs a steering operation in accordance with the control instruction that is output from the driving operation ECU 50. The braking device 56 includes a brake ECU and a brake actuator, and performs a braking operation in accordance with the control instruction that is output from the driving operation ECU 50.

[4.2. System Configuration of Occupant Protection Device 60]

The vehicle occupant protection device 60 includes the external environment sensors 62, the vehicle sensors 64, the air bag ECU 66, the air bag unit 30, and an air bag movement device 109.

The external environment sensors 62 acquire information that expresses an external environment state of the vehicle 10 (hereinafter, referred to as external environment information), and output the external environment information to the driving operation ECU 50 and the air bag ECU 66. The external environment sensors 62 include a plurality of vehicle outside cameras 68 that photograph the periphery of the vehicle 10, and a radar 70 and a LIDAR 72 that detect an object around the vehicle 10. The external environment sensors 62 further include each device that is not shown, for example, a navigation device, a communication device that communicates with the outside (for example, a road side machine, a broadcasting station, another vehicle), or the like.

The vehicle sensors 64 acquire information that expresses a state of the vehicle 10 itself (hereinafter, referred to as vehicle information), and output the vehicle information to the driving operation ECU 50 and the air bag ECU 66. The vehicle sensors 64 include a G sensor 74 that detects acceleration/deceleration generated in the vehicle 10, a pressure sensor 76 that detects the pressure applied from the outside to the vehicle 10, a vehicle inside camera 80 that photographs the vehicle compartment 12, a seat weight sensor 82 that detects the weight of the vehicle occupant who is seated on the seat 14, a seat direction sensor 84 that detects the direction of the base upper part 22U with respect to the base lower part 22L, and a seat position sensor 86 that detects the position of the base 22 on the rail 20. The G sensor 74 and the pressure sensor 76 function as a collision sensor 78 that detects information about a collision of the vehicle 10. The seat weight sensor 82, the seat direction sensor 84, and the seat position sensor 86 are provided to each seat 14. The vehicle sensors 64 include each sensor that is not shown, for example, a vehicle speed sensor that detects the speed of the vehicle (vehicle speed), a yaw rate sensor, an azimuth sensor, an inclination sensor, an accelerator pedal sensor, a brake pedal sensor, a steering angle sensor, or the like.

The air bag ECU 66 includes, as the function achievement units, a vehicle occupant determination unit 90, a collision determination unit 92, a seat disposition determination unit 94, a deployment control unit 96, a tension control unit 98, a cutting instruction unit 100, and a movement instruction unit 106. The air bag ECU 66 further includes a storage device 102 and a timer 104.

The vehicle occupant determination unit 90 determines vehicle occupant information, for example, whether the vehicle occupant is seated on each seat 14, the posture of the vehicle occupant, the weight of the vehicle occupant, or the like on the basis of image information from the vehicle inside camera 80 and/or a detection result from the seat weight sensor 82.

The collision determination unit 92 determines collision information, for example, whether the collision of the vehicle 10 occurs, the position of the collision (direction of collision), the impact of the collision, or the like on the basis of a detection result from the collision sensor 78. Moreover, the collision determination unit 92 can determine whether the collision of the vehicle 10 occurs on the basis of the image information from the vehicle outside cameras 68 or a detection result from the radar 70 or the LIDAR 72.

The seat disposition determination unit 94 determines the disposition of each seat 14, here, the direction of each seat 14 and the position of the base lower part 22L on the rail 20 on the basis of a detection result from the seat direction sensor 84 and the seat position sensor 86. Moreover, the seat disposition determination unit 94 can determine the disposition of each seat 14 on the basis of the image information from the vehicle inside camera 80.

The deployment control unit 96 determines whether the deployment of each air bag 16 is necessary on the basis of a determination result from the vehicle occupant determination unit 90, the collision determination unit 92, and the seat disposition determination unit 94, and outputs a deployment instruction to the air bag unit 30 that includes the air bag 16 that needs to be deployed.

The tension control unit 98 controls the tension of a strap (detailed description is made in paragraph [6.1] below) on the basis of the determination result from the vehicle occupant determination unit 90 and/or the collision determination unit 92. The cutting instruction unit 100 outputs an instruction for cutting the strap to a strap cutting device 108 in accordance with the control content of the tension control unit 98, or when a time measured by the timer 104 becomes more than a predetermined time. The movement instruction unit 106 outputs an operation instruction to the air bag movement device 109 in accordance with the position of the seat 14 that is determined by the seat disposition determination unit 94 (detailed description is made in paragraph [7] below).

The storage device 102 stores various kinds of programs, numerals (predetermined values), maps, or the like. The timer 104 starts the time measuring when the deployment control unit 96 outputs the deployment instruction to the air bag unit 30.

[5. Process of Vehicle Occupant Protection Device 60]

Figure 6:
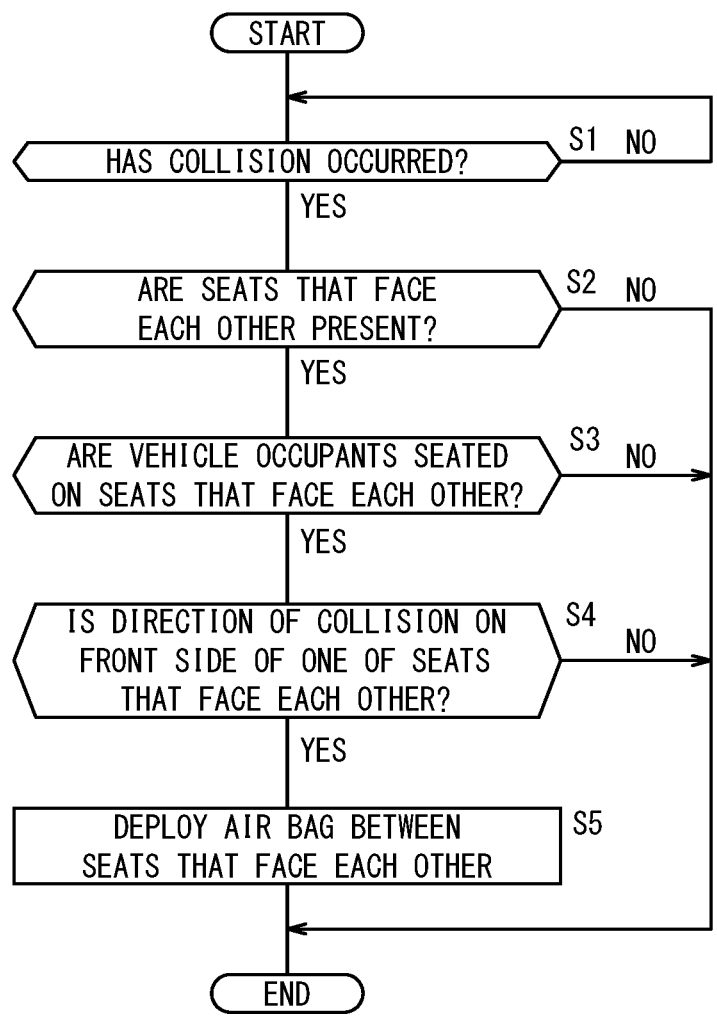
FIG. 6 is a flowchart of a first process.
Figure 7:
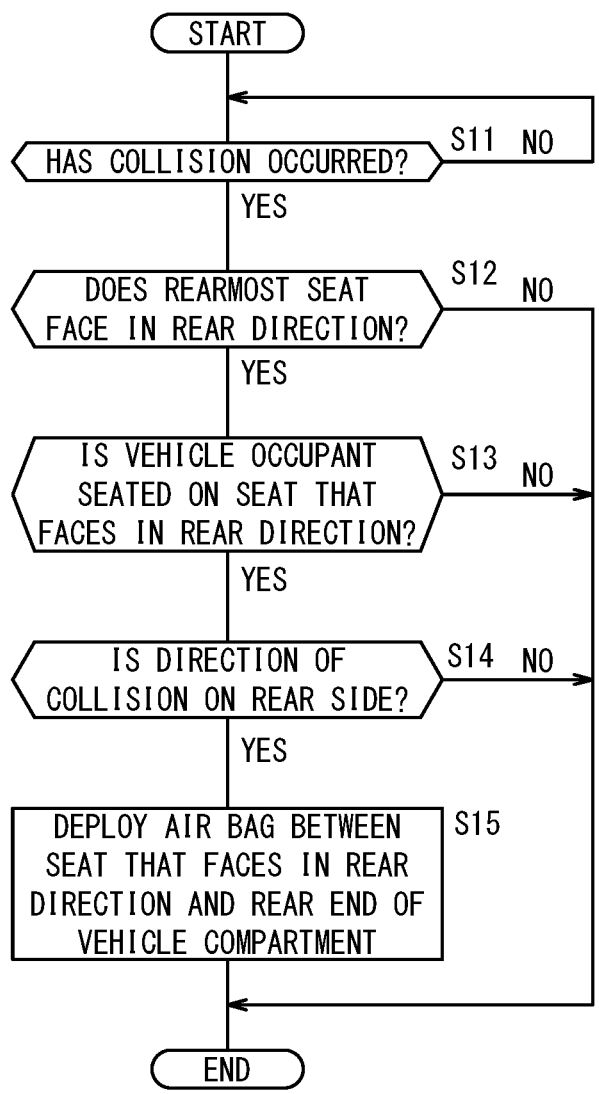
FIG. 7 is a flowchart of a second process.

In a state where a power source of the vehicle 10 is on, the vehicle occupant protection device 60 performs a first process shown in FIG. 6 and a second process shown in FIG. 7 simultaneously and continuously.

[5.1. First Process]

The first process is described with reference to FIG. 6. In step S1, it is determined whether the collision of the vehicle 10 has occurred. Here, if a value of the deceleration that is detected by the G sensor 74 becomes more than or equal to a predetermined value, and a pressure value that is detected by the pressure sensor 76 becomes more than or equal to a predetermined value, the collision determination unit 92 determines that the collision has occurred. If the collision has occurred (step S1: YES), the process advances to step S2. On the other hand, if the collision has not occurred (step S1: NO), the process of step S1 is repeatedly performed.

When the process has advanced from step S1 to step S2, it is determined whether the seats 14 that face each other are present. Here, the seat disposition determination unit 94 determines the direction of each seat 14 on the basis of the detection result from each seat direction sensor 84 or the image information from the vehicle inside camera 80, and determines whether the seats 14 that face each other are present. If the seats 14 that face each other are present (step S2: YES), the process advances to step S3. On the other hand, if the seats 14 that face each other (step S2: NO) are not present, the process ends.

When the process has advanced from step S2 to step S3, it is determined whether the vehicle occupants are seated on two seats 14 that face each other. Here, the vehicle occupant determination unit 90 determines whether the vehicle occupants are seated on the seats 14 that face each other on the basis of the image information from the vehicle inside camera 80 or the detection result from the seat weight sensor 82. If the vehicle occupants are seated on both the seats 14 that face each other (step S3: YES), the process advances to step S4. On the other hand, if the vehicle occupant is not seated on one of the seats 14 that face each other or the vehicle occupants are seated on neither of the seats 14 that face each other (step S3: NO), the process ends.

When the process has advanced from step S3 to step S4, it is determined whether the direction of the collision is on a front side of one of the seats 14 that face each other. Here, the collision determination unit 92 determines the direction of the collision on the basis of the detection result from the collision sensor 78. Moreover, the seat disposition determination unit 94 has determined the direction of the seats 14 that face each other in step S2. If the direction of the collision is on the front side of one of the seats 14 that face each other (step S4: YES), the process advances to step S5. On the other hand, if the direction of the collision is not on the front side of the seats 14 that face each other (step S4: NO), the process ends.

Specifically, as illustrated in FIG. 3A, if the seat 14 (14D) and the seat 14 (14G) that are adjacent to each other in the front-rear direction face each other, the vehicle occupants are seated on both the seats 14 (14D, 14G), and the direction of the collision is the front direction or the rear direction, then the process advances to step S5. Similarly, as illustrated in FIG. 3B, if the seat 14 (14C) and the seat 14 (14D) that are adjacent to each other in the vehicle width direction face each other, the vehicle occupants are seated on both the seats 14 (14C, 14D), and the direction of the collision is the left direction or the right direction, then the process advances to step S5. This process similarly applies to the other seats 14.

Back to FIG. 6, the description is continued. When the process has advanced from step S4 to step S5, the air bag 16 is deployed between the seats 14 that face each other. Here, the deployment control unit 96 determines a deployment area of the air bag 16 in accordance with the positions of the seats 14 that face each other. Then, the deployment control unit 96 outputs the deployment instruction to the gas supply device 32 of the air bag unit 30 that is provided at a position corresponding to the deployment area.

For example, as illustrated in FIG. 3A, in a case where the seat 14D and the seat 14G that are adjacent to each other in the front-rear direction face each other, the air bag 16D is deployed between the seat 14D and the seat 14G. Similarly, as illustrated in FIG. 3B, if the seat 14C and the seat 14D that are adjacent to each other in the vehicle width direction face each other, the air bag 16G is deployed between the seat 14C and the seat 14D.

[5.2. Second Process]

The second process is described with reference to FIG. 7. The process of step S11 is the same as the process of step S1 shown in FIG. 6.

When the process has advanced from step S11 to step S12, it is determined whether a rearmost seat 14 faces in the rear direction. Here, the seat disposition determination unit 94 determines the direction of each rearmost (third row) seat 14 (14F to 14H) on the basis of the detection result from each seat direction sensor 84 or the image information from the vehicle inside camera 80, and determines whether the seat 14 that faces in the rear direction is present. If the seat 14 that faces in the rear direction is present (step S12: YES), the process advances to step S3. On the other hand, if the seat 14 that faces in the rear direction is not present (step S12: NO), the process ends.

When the process has advanced from step S11 to step S12, it is determined whether a rearmost seat 14 faces in the rear direction. Here, the seat disposition determination unit 94 determines the direction of each rearmost (third row) seat 14 (14F to 14H) on the basis of the detection result from each seat direction sensor 84 or the image information from the vehicle inside camera 80, and determines whether the seat 14 that faces in the rear direction is present. If the seat 14 that faces in the rear direction is present (step S12: YES), the process advances to step S13. On the other hand, if the seat 14 that faces in the rear direction is not present (step S12: NO), the process ends.

When the process has advanced from step S13 to step S14, it is determined whether the direction of the collision is on the rear side. Here, the collision determination unit 92 determines the direction of the collision on the basis of the detection result from the collision sensor 78. If the direction of the collision is on the rear side (step S14: YES), the process advances to step S15. On the other hand, if the direction of the collision is not on the rear side (step S14: NO), the process ends.

Specifically, as illustrated in FIG. 3C, if the seat 14 (14G) in the third row faces in the rear direction, the vehicle occupant is seated on the seat 14 (14G), and the direction of the collision is on the rear direction, then the process advances to step S15.

Back to FIG. 7, the description is continued. When the process has advanced from step S14 to step S15, the air bag 16 is deployed between the seat 14 that faces in the rear direction and the rear end 12B of the vehicle compartment. Here, the deployment control unit 96 outputs the deployment instruction to the gas supply device 32 of the air bag unit 30 whose deployment area is between the seat 14 and the rear end 12B of the vehicle compartment.

For example, as illustrated in FIG. 3C, in a case where the seat 14G in the third row faces in the rear direction, the air bag 16I is deployed between the seat 14G and the rear end 12B of the vehicle compartment.

[6. Reaction Force Applying Mechanism of Air Bag 16]

In the above embodiment, the air bag 16 (16C to 16J) that is deployed downward from the roof 40 is provided with a reaction force applying mechanism in order to apply force that resists the load of the vehicle occupant who moves to the direction of the collision, that is, reaction force.

[6.1. Strap]

As illustrated in FIG. 8 to FIG. 11 and FIG. 13 to FIG. 15, the strap is used as one embodiment of the reaction force applying mechanism. The embodiment of the air bag unit 30 that includes the strap is hereinafter described.

[6.1.1. First Embodiment]

Figure 8:
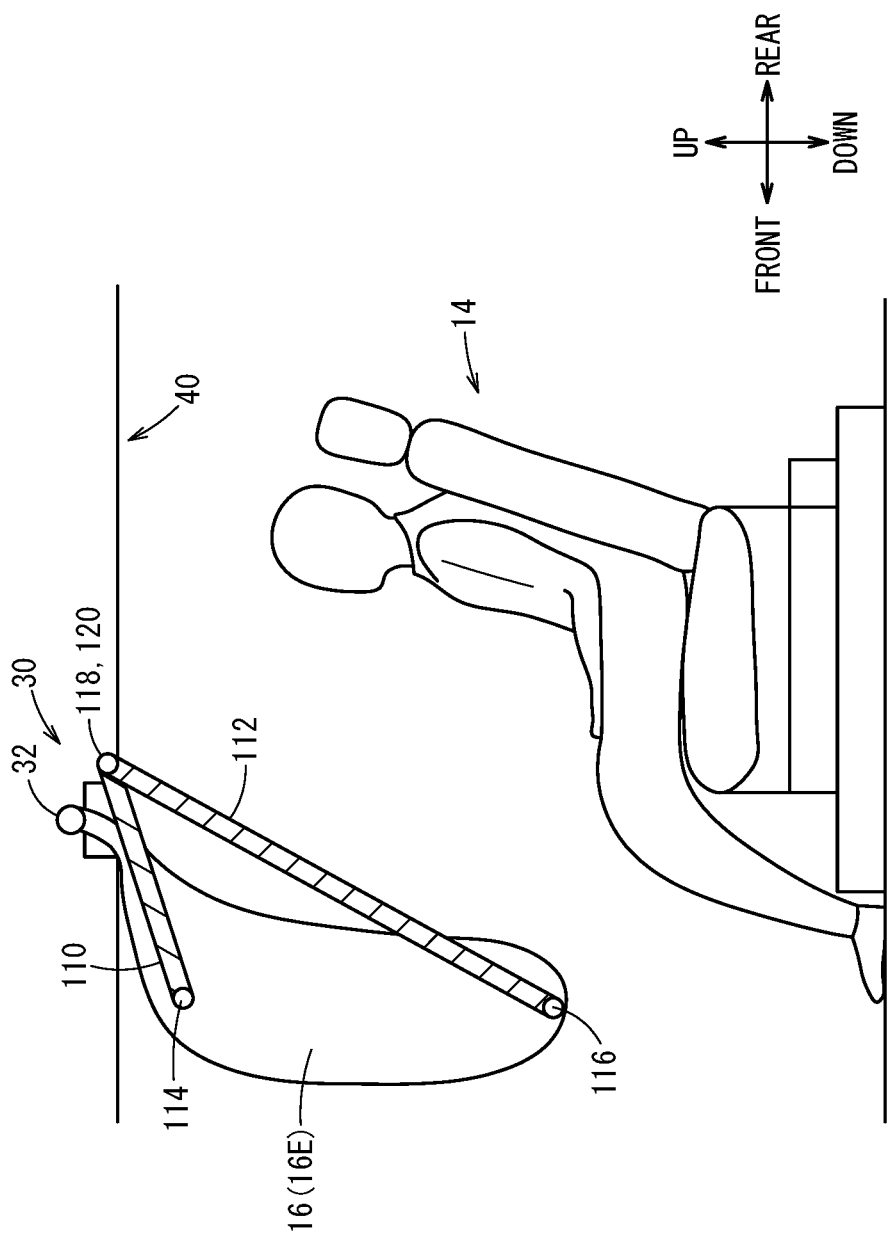
FIG. 8 is a schematic diagram of a first embodiment regarding straps as a reaction force applying mechanism.
Figure 9:
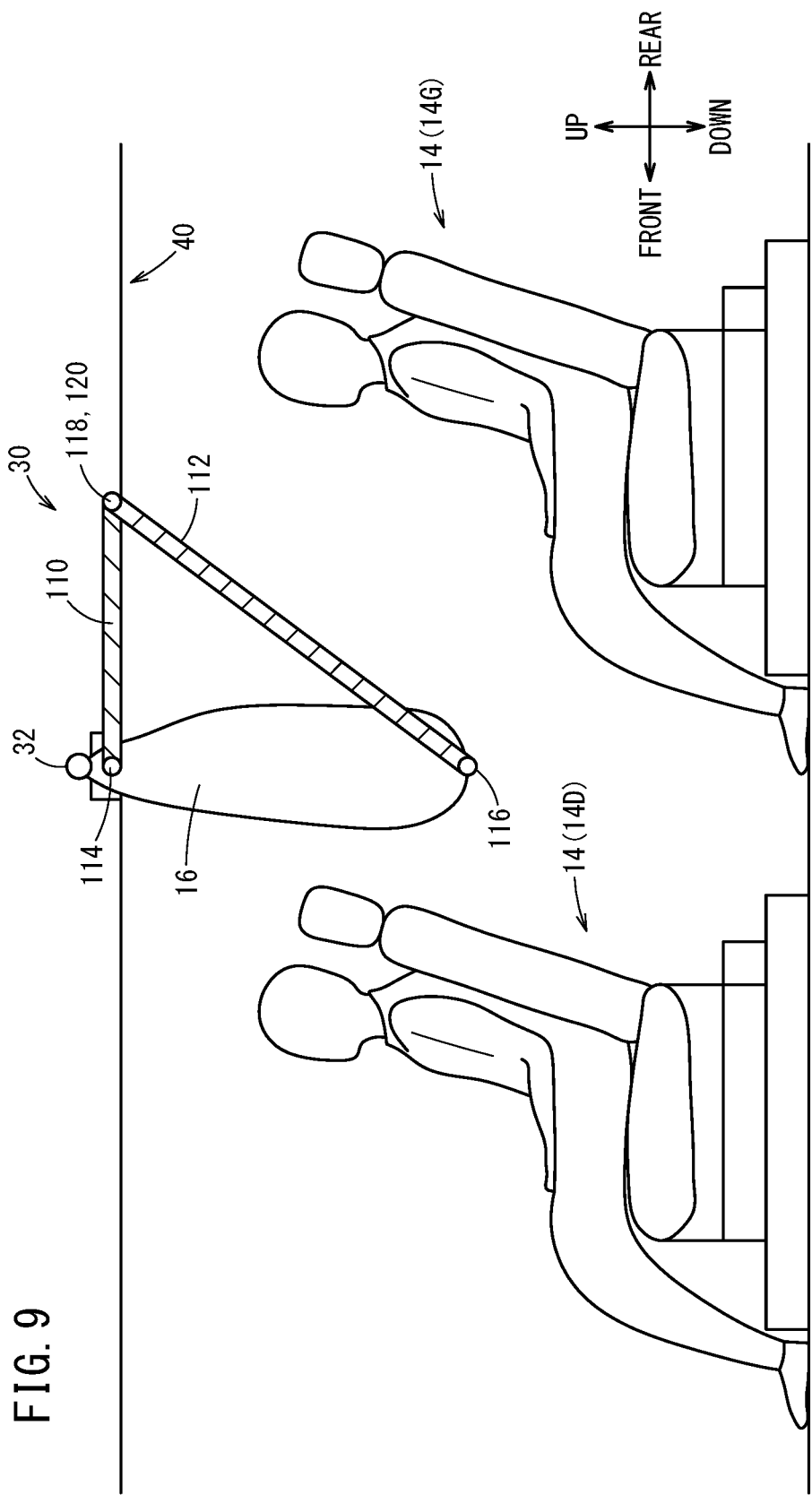
FIG. 9 is a schematic diagram of the first embodiment regarding the straps as the reaction force applying mechanism.

A first embodiment is described with reference to FIG. 8 and FIG. 9. FIG. 9 illustrates the seats 14D, 14G as one example of the seats 14 that are adjacent to each other; however, the seats 14 may be other seats. In FIG. 8 and FIG. 9, the direction of the seat 14 (14G) is the front direction.

The air bag unit 30 includes a first strap 110 and a second strap 112 that have one end fixed to the air bag 16 and the other end fixed to the roof 40. The first strap 110 and the second strap 112 are provided on both sides of the air bag 16 in a width direction. The width direction of the air bag 16 herein described is a direction that is orthogonal to the direction of the seat 14 on which the vehicle occupant corresponding to a protection target is seated. The width direction of the air bags 16C to 16E is a direction that is parallel to the vehicle width direction, and the width direction of the air bags 16F to 16J is a direction that is parallel to the front-rear direction. The first strap 110 and the second strap 112 are made of the same chemical fiber as that of the air bag 16, for example.

The air bag 16 and the one end of the first strap 110 are fixed by a fixing part 114, and the air bag 16 and the one end of the second strap 112 are fixed by a fixing part 116. In a state where the air bag 16 is deployed, the fixing part 114 is positioned above the fixing part 116. The fixing part 114 is positioned at a part of the deployed air bag 16 that is near the roof 40, and the fixing part 116 is positioned at an approximately lower end of the deployed air bag 16.

The roof 40 and the other end of the first strap 110 are fixed by a fixing part 118, and the roof 40 and the other end of the second strap 112 are fixed by a fixing part 120. In the state where the air bag 16 is deployed, the fixing part 118 is positioned behind the fixing part 114, that is, behind the deployment area of the air bag 16. Similarly, the fixing part 120 is positioned behind the fixing part 116, that is, behind the deployment area of the air bag 16. The fixing part 118 and the fixing part 120 may be provided at the same position, or at different positions. The fixing part 118 and the fixing part 120 are provided to a roof panel or a roof arch as the outer member 40o (FIG. 4), or a roof lining as the inner member 40i (FIG. 4).

In a non-deployed state of the air bag 16, the first strap 110 and the second strap 112 are provided along the inner member 40*i* of the roof 40.

As illustrated in FIG. 8, the gas supply device 32 and the air bag 16 in the non-deployed state may be positioned above the seat 14. As illustrated in FIG. 9, the gas supply device 32 and the air bag 16 in the non-deployed state may be positioned above, between the seats 14 (14D, 14G) that are adjacent to each other. In the disposition illustrated in FIG. 8, at the beginning of the deployment, the air bag 16 (16E) is deployed from above the vehicle occupant to the front of the seat 14 (14G), and after the beginning of the deployment, the air bag 16 (16E) is deployed downward and positioned in front of the seat 14 and the vehicle occupant. In the disposition illustrated in FIG. 9, at the beginning of the deployment, the air bag 16 (16E) is deployed from above the vehicle occupant to the front of the seat 14 (14G), and after the beginning of the deployment, the air bag 16 (16E) is deployed downward and positioned in front of the seat 14 (14G) and the vehicle occupant.

In the case where the direction of the seat 14 is the front direction, if the collision occurs in the front direction of the vehicle 10, the vehicle occupant who is seated on the seat 14 moves to the front direction. At this time, the air bag 16 is deployed and positioned in the deployment area. As the vehicle occupant moves, the load of the vehicle occupant is applied to the air bag 16. When the load is applied, the first strap 110 and the second strap 112 apply the reaction force that resists the load to the air bag 16. As a result, the air bag 16 is kept in the deployment area.

[6.1.2. Second Embodiment]

Figure 10:
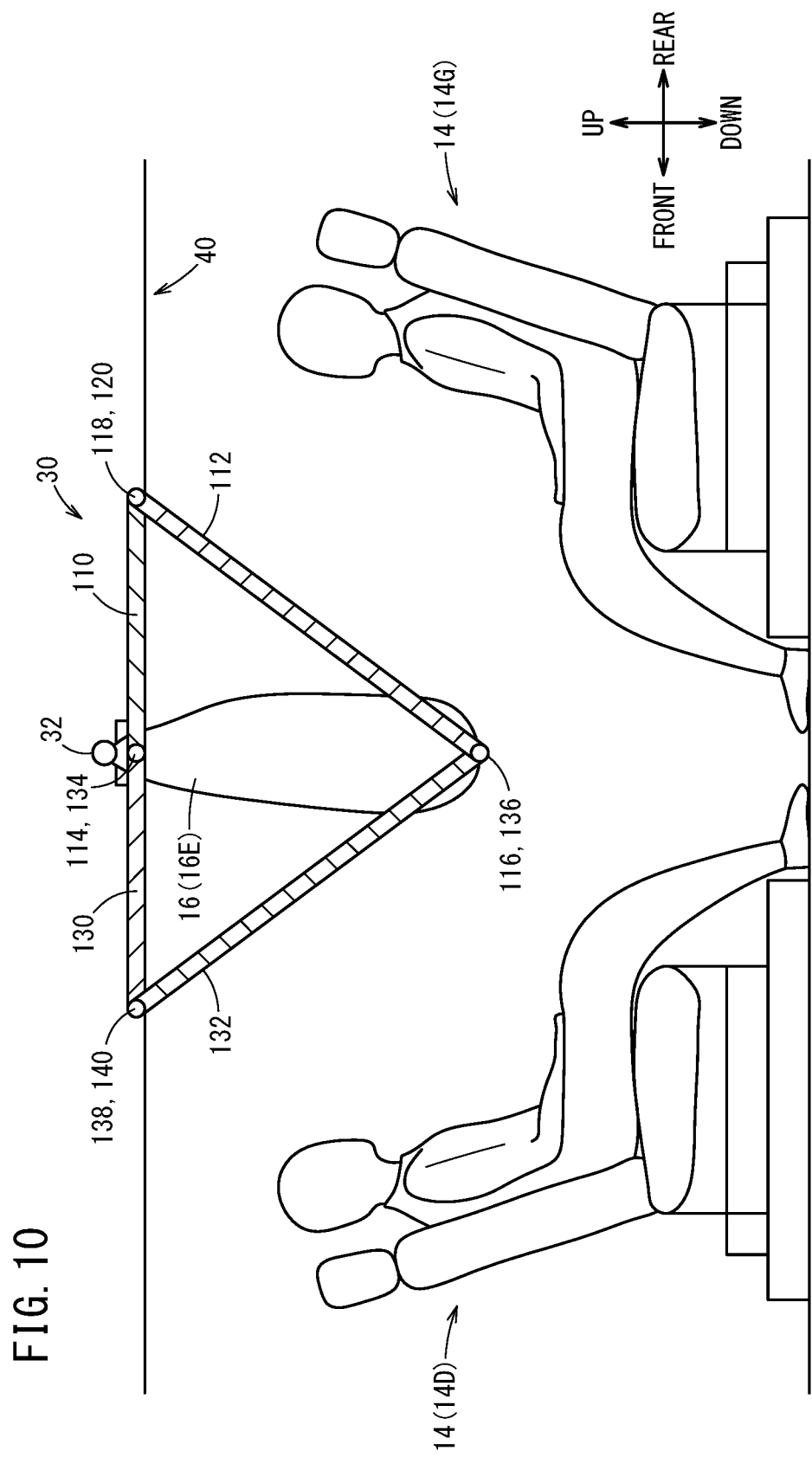
FIG. 10 is a schematic diagram of a second embodiment regarding straps as the reaction force applying mechanism.

A second embodiment is described with reference to FIG. 10. FIG. 10 illustrates the seats 14D, 14G as one example of the seats 14 that face each other; however, the seats 14 may be other seats. In FIG. 10, the direction of the seat 14 (14G) is the front direction and the direction of the seat 14 (14D) is the rear direction. In the second embodiment, a third strap 130 and a fourth strap 132 are added to the structure according to the first embodiment. The third strap 130 and the fourth strap 132 are provided at positions opposite to the first strap 110 and the second strap 112, respectively.

The air bag 16 and one end of the third strap 130 are fixed by a fixing part 134, and the air bag 16 and one end of the fourth strap 132 are fixed by a fixing part 136. In the state where the air bag 16 is deployed, the fixing part 134 is positioned above the fixing part 136. The fixing part 134 is positioned at a part of the deployed air bag 16 that is near the roof 40, and the fixing part 136 is positioned at an approximately lower end of the deployed air bag 16.

The roof 40 and the other end of the third strap 130 are fixed by a fixing part 138, and the roof 40 and the other end of the fourth strap 132 are fixed by a fixing part 140. In the state where the air bag 16 is deployed, the fixing part 138 is positioned ahead of the fixing part 134, that is, ahead of the deployment area of the air bag 16. Similarly, the fixing part 140 is positioned ahead of the fixing part 136, that is, ahead of the deployment area of the air bag 16. The fixing part 138 and the fixing part 140 may be provided at the same position, or at different positions. The fixing part 138 and the fixing part 140 are provided to the roof panel or the roof arch as the outer member 40*o* (FIG. 4), or the roof lining as the inner member 40*i* (FIG. 4).

In the non-deployed state of the air bag 16, the third strap 130 and the fourth strap 132 are provided along the inner member 40*i* of the roof 40.

In the case where the direction of the seat 14D is the rear direction, if the collision occurs in the rear direction of the vehicle 10, the vehicle occupant who is seated on the seat 14D moves in the rear direction. At this time, the air bag 16E is deployed and positioned in the deployment area. As the vehicle occupant moves, the load of the vehicle occupant is applied to the air bag 16E. When the load is applied, the third strap 130 and the fourth strap 132 apply the reaction force that resists the load to the air bag 16E. As a result, the air bag 16E is kept in the deployment area.

[6.1.3. Third Embodiment]

A third embodiment is described with reference to FIG. 11 and FIG. 12. In the third embodiment, the tension of the first strap 110 and the second strap 112 according to the first embodiment can be changed.

Figure 11:
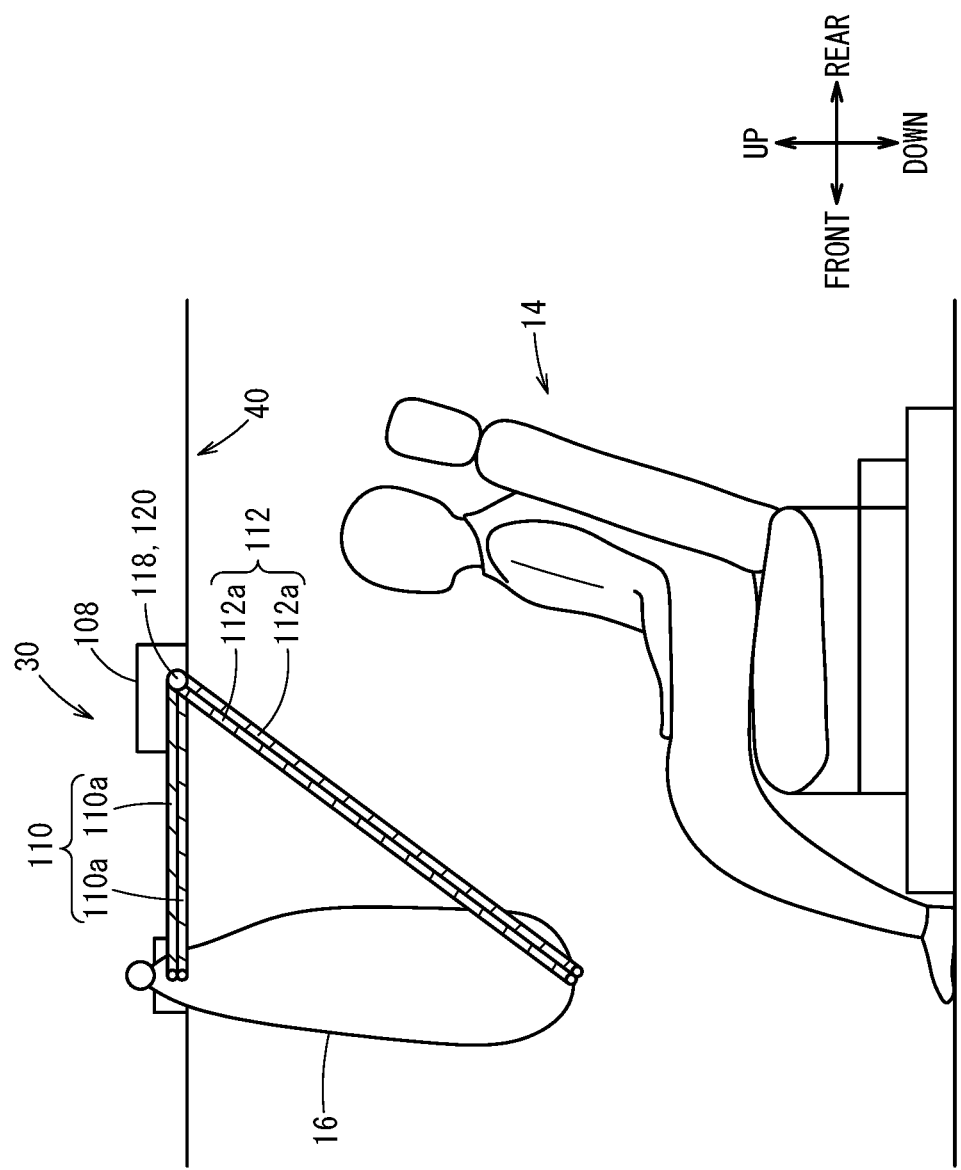
FIG. 11 is a schematic diagram of a third embodiment regarding straps as the reaction force applying mechanism.
Figure 12:
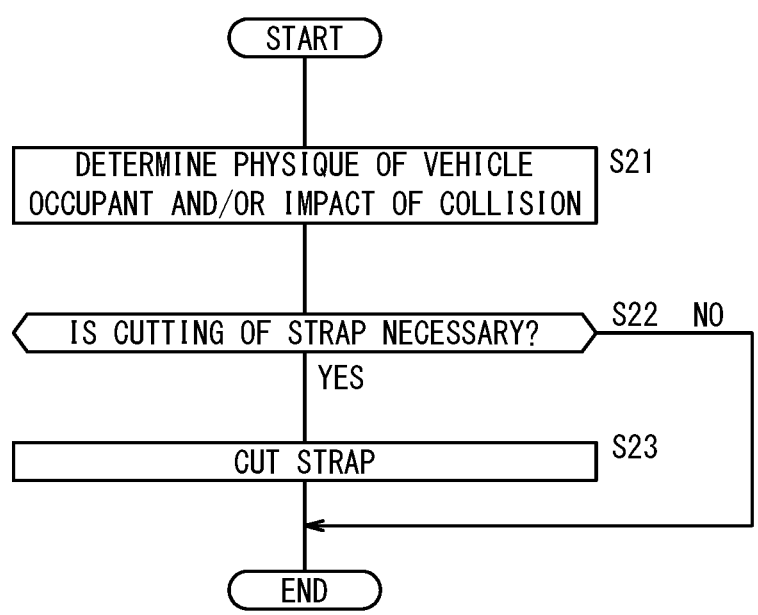
FIG. 12 is a flowchart of the third embodiment regarding the straps as the reaction force applying mechanism.

As illustrated in FIG. 11, the first strap 110 includes a plurality of strap members 110*a*, and the second strap 112 includes a plurality of strap members 112*a*. The strap cutting device 108 is provided at the fixing part 118 for the roof 40 and the other end of the first strap 110, and the fixing part 120 for the roof 40 and the other end of the second strap 112. The strap cutting device 108 burns gunpowder in accordance with the cutting instruction that is output from the cutting instruction unit 100 (FIG. 5), and cuts the strap members 110*a*, 112*a* from the fixing parts 118, 120. The gunpowder is provided to each of the strap members 110*a*, 112*a*. Thus, the strap members 110*a*, 112*a* can be selectively cut from the fixing parts 118, 120.

The process of the third embodiment is described with reference to FIG. 12. After the air bag 16 is deployed by the process of FIG. 6 or FIG. 7, the process of FIG. 12 is started. In step S21, the physique of the vehicle occupant and/or the impact of the collision is determined. Here, by comparing the size of the vehicle occupant that is recognized on the basis of the image information from the vehicle inside camera 80 and a predetermined size, the vehicle occupant determination unit 90 determines whether the physique of the vehicle occupant is large or small. Alternatively, by comparing the weight of the vehicle occupant that is detected by the seat weight sensor 82 and predetermined weight, the vehicle occupant determination unit 90 determines whether the physique of the vehicle occupant is large or small. By comparing the deceleration that is detected by the G sensor 74 when the collision occurs and predetermined deceleration, the collision determination unit 92 determines whether the impact of the collision is large or small. Alternatively, by comparing the pressure that is detected by the pressure sensor 76 when the collision occurs and predetermined pressure, the collision determination unit 92 determines whether the impact of the collision is large or small.

In step S22, it is determined whether the first strap 110 and the second strap 112 should be cut. Here, if the vehicle occupant determination unit 90 determines that the size of the vehicle occupant is small and/or the collision determination unit 92 determines that the impact of the collision is small, the tension control unit 98 determines that the cutting is necessary. On the other hand, if the vehicle occupant determination unit 90 determines that the size of the vehicle occupant is large and the collision determination unit 92 determines that the impact of the collision is large, the tension control unit 98 determines that the cutting is not necessary. If it is determined that the cutting is necessary (step S22: YES), the process advances to step S23. On the other hand, if it is determined that the cutting is not necessary (step S22: NO), the process ends.

When the process has advanced from step S22 to step S23, the tension control unit 98 decides the cutting amount of the strap members 110*a*, 112*a* to control the tension of the first strap 110 and the second strap 112. In this case, for example, a map in which input information is the physique of the vehicle occupant and/or the impact of the collision and output information is the cutting amount of the strap members 110a, 112a is used. The map is stored in the storage device 102. The cutting instruction unit 100 outputs the cutting instruction to the strap cutting device 108 on the basis of a decision result from the tension control unit 98. The strap cutting device 108 cuts the strap members 110a, 112a by the cutting amount that is instructed by the cutting instruction.

The energy absorption amount of the first strap 110 and the second strap 112 is based on the tension, and the tension is based on the amount of the strap members 110a, 112a. As the amount of the strap members 110a, 112a is larger, the tension is larger, the energy absorption amount is smaller, and the strength is higher. On the other hand, as the amount of the strap members 110a, 112a is smaller, the tension is smaller, the energy absorption amount is larger, and the strength is lower. In the present embodiment, if the size of the vehicle occupant is small or the impact of the collision is small, the amount of the strap members 110a, 112a is reduced, so that the energy absorption amount becomes large. On the other hand, if the size of the vehicle occupant is large or the impact of the collision is large, the amount of the strap members 110a, 112a is increased, so that the strength becomes high.

[6.1.4. Fourth Embodiment]

A fourth embodiment is described with reference to FIG. 13. In the fourth embodiment, energy absorption members (a first spring 142 and a second spring 144) are provided to the first strap 110 and the second strap 112 according to the first embodiment.

The first spring 142 is provided between the roof 40 and the other end of the first strap 110, and the second spring 144 is provided between the roof 40 and the other end of the second strap 112. The second spring 144 that is positioned below has a larger spring constant than the first spring 142 that is positioned above. Each spring constant can be set appropriately.

In the case where the direction of the seat 14 is the front direction, if the collision occurs in the front direction of the vehicle 10, the vehicle occupant who is seated on the seat 14 moves to the front direction. At this time, the air bag 16 is deployed and positioned in the deployment area.

As the vehicle occupant moves in the collision, the load of the vehicle occupant is applied to the air bag 16. When the load is applied, the first strap 110 and the second strap 112 apply the reaction force that resists the load to the air bag 16. In this state, the first spring 142 and the second spring 144 absorb the energy by expanding in accordance with the load.

[6.1.5. Fifth Embodiment]

A fifth embodiment is described with reference to FIG. 14. In the fifth embodiment, a sheet member 146 that extends between the second strap 112 and the roof 40 according to the first embodiment is provided.

The sheet member 146 is provided between the roof 40 and the second strap 112. The sheet member 146 is attached to the roof 40 at a position that is approximately right above the second strap 112 in the deployed state of the air bag 16. The sheet member 146 is made of the same chemical fiber as that of the air bag 16, for example. Note that the sheet member 146 may be provided between the first strap 110 and the second strap 112.

[6.1.6. Sixth Embodiment]

Figure 15:
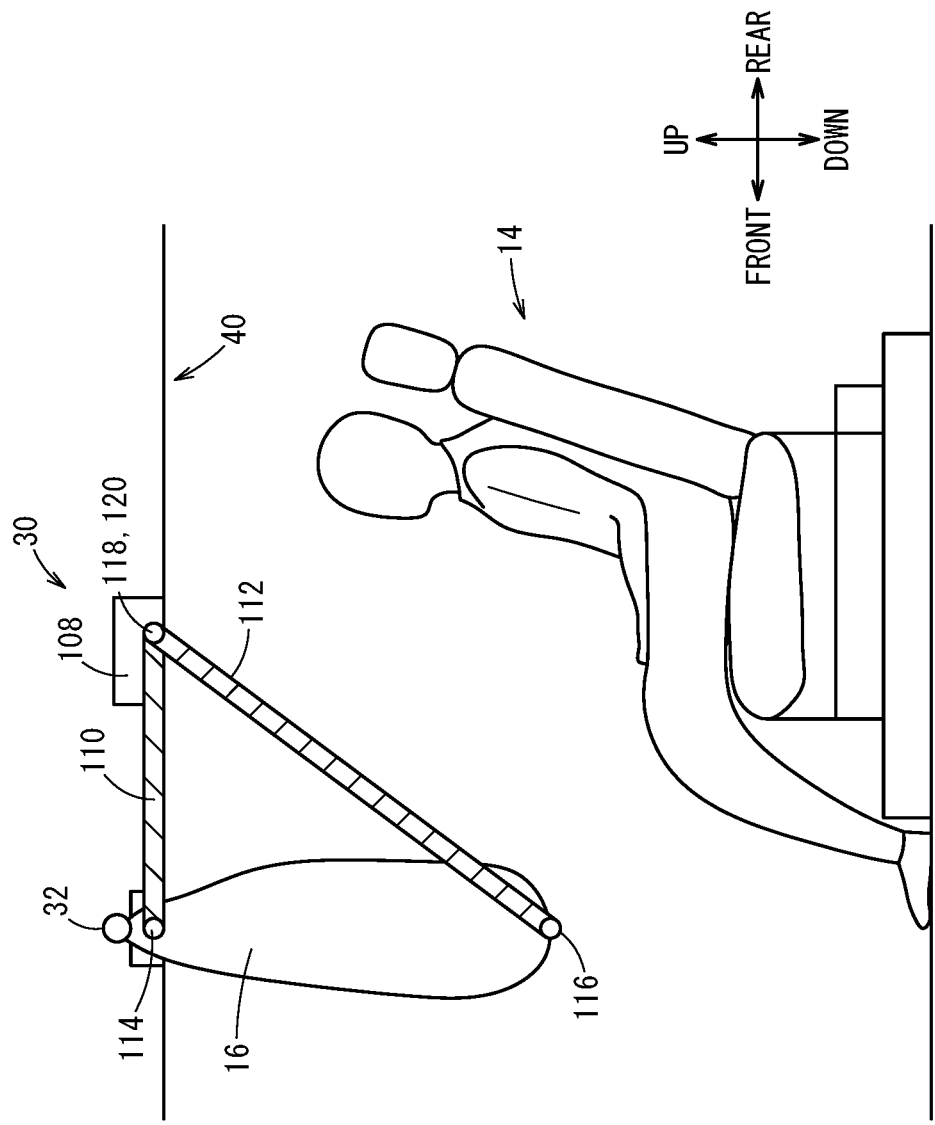
FIG. 15 is a schematic diagram of a sixth embodiment regarding straps as the reaction force applying mechanism.
Figure 16:
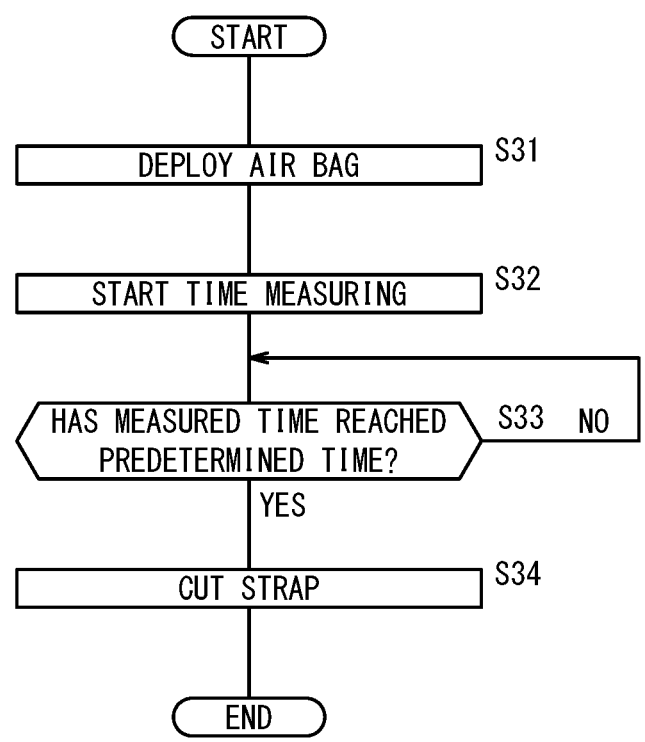
FIG. 16 is a flowchart of the sixth embodiment regarding the straps as the reaction force applying mechanism.

A sixth embodiment is described with reference to FIG. 15 and FIG. 16. In the sixth embodiment, the first strap 110 and the second strap 112 according to the first embodiment can be cut after a predetermined time elapses.

Figure 13:
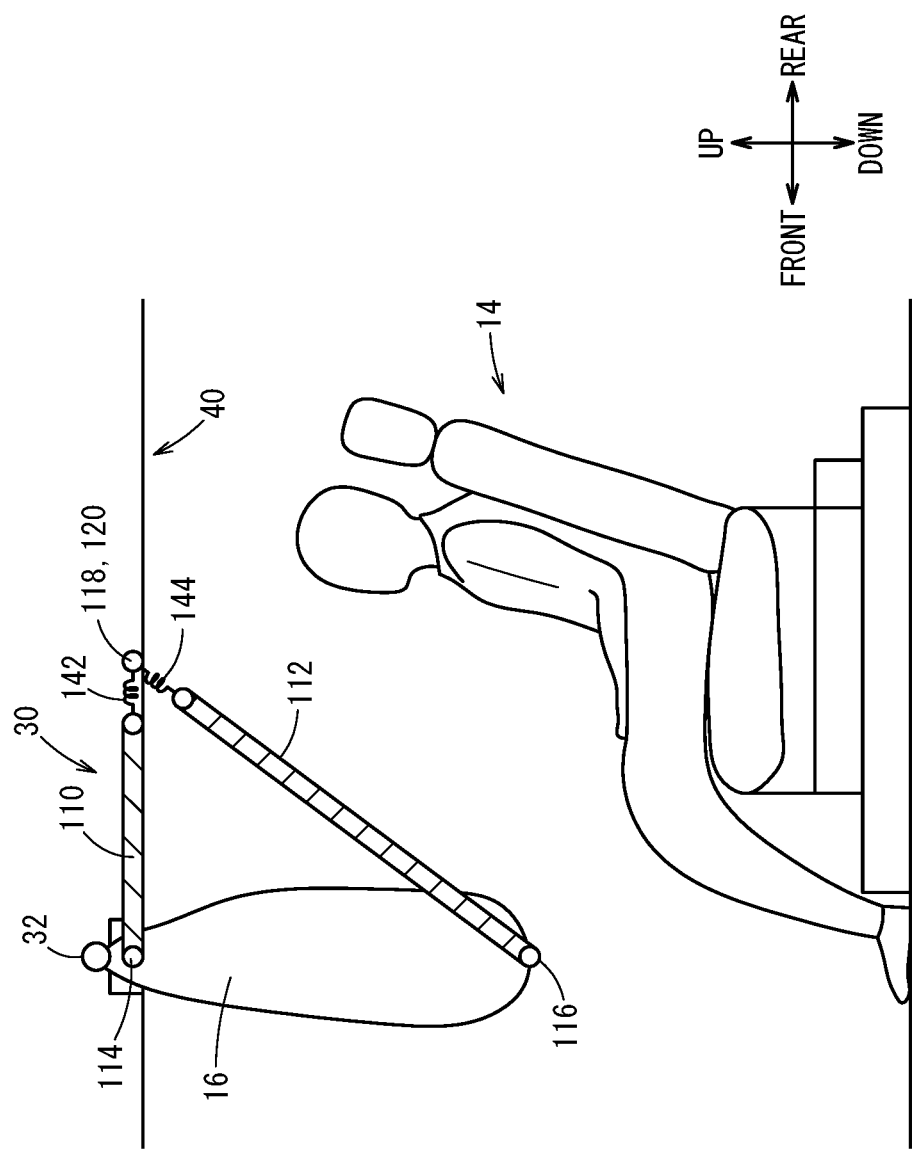
FIG. 13 is a schematic diagram of a fourth embodiment regarding straps as the reaction force applying mechanism.

Similarly to the third embodiment illustrated in FIG. 13, the strap cutting device 108 is provided at the fixing part 118 for the roof 40 and the other end of the first strap 110, and the fixing part 120 for the roof 40 and the other end of the second strap 112.

The process of the sixth embodiment is described with reference to FIG. 16. After the process of FIG. 6 or FIG. 7, the process of FIG. 16 is started. In step S31, the deployment control unit 96 outputs the deployment instruction so that the air bag 16 starts to be deployed. This process corresponds to the process of step S5 in FIG. 6 and the process of step S15 in FIG. 7. In step S32, the timer 104 starts the time measuring at the same time as the deployment control unit 96 outputs the deployment instruction.

In step S33, it is determined whether the measured time has reached the predetermined time. The cutting instruction unit 100 compares the time measured by the timer 104 and the predetermined time that is stored in the storage device 102. If the time measured by the timer 104 has exceeded the predetermined time (step S33: YES), the process advances to step S34. On the other hand, if the time measured by the timer 104 has not exceeded the predetermined time (step S33: NO), the determination in step S33 is repeatedly performed.

When the process has advanced from step S33 to step S34, the cutting instruction unit 100 outputs the cutting instruction to the strap cutting device 108. The strap cutting device 108 cuts the first strap 110 and the second strap 112 in accordance with the cutting instruction.

The air bag 16 shrinks in a certain period of time after the air bag 16 is deployed. In this state, the first strap 110 and the second strap 112 have become useless. The first strap 110 and the second strap 112 are obstructions when the vehicle occupant moves in the vehicle compartment 12. Thus, in the sixth embodiment, the first strap 110 and the second strap 112 that have become useless are cut, so that the vehicle occupant can move in the vehicle compartment 12 easily.

The first embodiment to the sixth embodiment described above can be combined with each other.

[6.2. Monitor Device 148]

Figure 17:
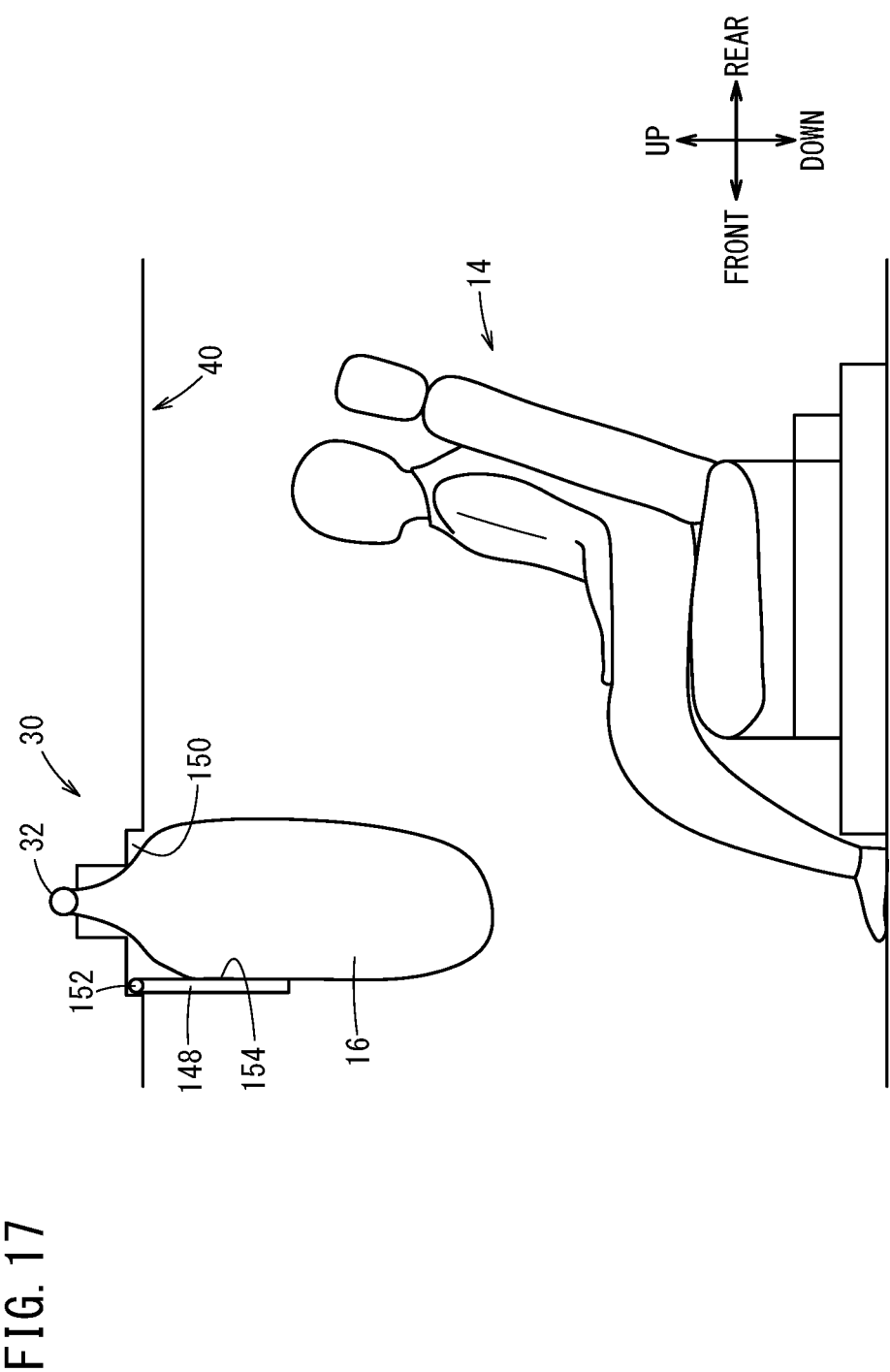
FIG. 17 is a schematic diagram of the embodiment regarding a monitor device as the reaction force applying mechanism.

As illustrated in FIG. 17, a monitor device 148 is used as one embodiment of the reaction force applying mechanism. The embodiment of the air bag unit 30 that includes the monitor device 148 is hereinafter described.

The monitor device 148 and a housing unit 150 are provided to the roof 40. The monitor device 148 is housed in the housing unit 150 when the monitor device 148 is unused. In this state, a rotation axis 152 that is at a front end of the monitor device 148 is supported on the roof 40 side such that the rotation axis 152 can be turned. When the monitor device 148 is used, the monitor device 148 is turned backward about the rotation axis 152. Thus, a screen 154 is disposed in front of the seat 14. The rotation axis 152 is provided with a stopper (not shown) that defines the maximum rotation angle.

The gas supply device 32 and the air bag 16 in the non-deployed state are provided at a position of the housing unit 150. Then, the air bag 16 is deployed downward from the housing unit 150. The monitor device 148 is turned backward by the pressure of the air bag 16, and is stopped at the position of the maximum rotation angle that is defined by the stopper. At this time, the screen 154 of the monitor device 148 is in contact with a part of a front surface of the air bag 16 and applies the reaction force to the air bag 16.

[7. Air Bag Movement Device 109]

The air bag movement device 109 is described with reference to FIG. 18. The air bag movement device 109 includes a movement base 158 to which the air bag unit 30 is fixed, a movement mechanism 160 that moves the movement base 158 in accordance with the movement direction of the seat 14, and a motor 162 that supplies motive power to the movement mechanism 160. As the movement mechanism 160, for example, a mechanism that moves the movement base 158 by rotating a ball screw, a mechanism that moves the movement base 158 by rotating a timing belt, or the like can be used.

The movement instruction unit 106 of the air bag ECU 66 determines the movement amount of the seat 14 in the front-rear direction on the basis of the detection result from the seat position sensor 86. The movement instruction unit 106 acquires the movement amount of the movement base 158 in accordance with the movement amount of the seat 14 on the basis of the map that is stored in the storage device 102. Then, the movement instruction unit 106 outputs the operation instruction to the air bag movement device 109.

The motor 162 of the air bag movement device 109 operates in accordance with the operation instruction. The movement mechanism 160 operates as the motor 162 operates, and the movement base 158 moves in the front-rear direction. As a result, the position of the air bag unit 30 is changed in the front-rear direction in accordance with the position of the seat 14 in the front-rear direction.

[8. Summary of Embodiments]

As illustrated in FIG. 3A and FIG. 3B, the vehicle occupant protection device 60 according to the present invention includes: the air bag 16 (16D) configured to be deployed between the two seats 14 (14D, 14G) that are adjacent to each other; the deployment control unit 96 configured to deploy the air bag 16 (16D); the seat disposition determination unit 94 configured to determine the directions of the two seats 14 (14D, 14G); and the collision determination unit 92 configured to determine the information about the collision of the vehicle 10. If the direction of the one of the seats 14 (14D) and the direction of the other of the seats 14 (14G) that are determined by the seat disposition determination unit 94 face each other, and if the direction of the collision that is determined by the collision determination unit 92 is on the front side of the one seat 14 (14D) or the front side of the other seat 14 (14G), the deployment control unit 96 deploys the air bag 16 (16D).

By the above structure, if the two seats 14D, 14G face each other, and if the collision occurs so that the vehicle occupant moves from the one seat 14D toward the other seat 14G or the collision occurs so that the vehicle occupant moves from the other seat 14G toward the one seat 14D, the air bag 16D is deployed between the two seats 14D, 14G. Thus, the one air bag 16D can appropriately protect both the vehicle occupants who are seated on the seats 14D, 14G that face each other.

Moreover, as illustrated in FIG. 3C, the vehicle occupant protection device 60 according to the present invention includes: the air bag 16 (16E) configured to be deployed between the rearmost seat 14 (14G) in the vehicle compartment 12 and the rear end 12B of the vehicle compartment; the deployment control unit 96 configured to deploy the air bag 16 (16E); the seat disposition determination unit 94 configured to determine the direction of the seat 14 (14G); and the collision determination unit 92 configured to determine the information about the collision of the vehicle 10. If the direction of the seat 14 (14G) that is determined by the seat disposition determination unit 94 is the rear direction of the vehicle 10, and if the direction of the collision that is determined by the collision determination unit 92 is on the rear side of the vehicle 10, the deployment control unit 96 deploys the air bag 16E.

By the above structure, if the rearmost seat 14G faces in the rear direction and the collision occurs so that the vehicle occupant moves from the rearmost seat 14G toward the rear end 12B of the vehicle compartment, the air bag 16E is deployed between the rearmost seat 14G and the rear end 12B of the vehicle compartment. Thus, the vehicle occupant who is seated on the rearmost seat 14G and faces in the rear direction can be appropriately protected.

The air bag 16 is configured to be deployed from the roof 40 in the downward direction of the vehicle 10. By the above structure, the air bag unit 30 is provided to the wide roof 40. Thus, the position at which the air bag unit 30 is disposed can be more freely selected. In addition, the air bag unit 30 can be disposed between the seats 14 individually.

The air bag 16 may be configured to be deployed from the roof side rail 42 or the pillar 44 toward the center in the vehicle width direction. By the above structure, the variation of the position at which the air bag 16 is disposed increases. Thus, the position at which the air bag 16 is disposed can be more freely selected.

As illustrated in FIG. 8 to FIG. 11 and FIG. 13 to FIG. 15, the vehicle occupant protection device 60 includes the first strap 110 and the second strap 112, each having the one end fixed to the air bag 16 and the other end fixed to the roof 40. The fixing part 114 for the deployed air bag 16 and the first strap 110 is positioned above the fixing part 116 for the deployed air bag 16 and the second strap 112. By the above structure, the first strap 110 and the second strap 112 can apply the reaction force to the air bag 16.

The vehicle occupant protection device 60 includes: the vehicle occupant determination unit 90 configured to determine the physique of the vehicle occupant; and the tension control unit 98 configured to control the tensions of the first strap 110 and the second strap 112 on the basis of the physique of the vehicle occupant that is determined by the vehicle occupant determination unit 90 and/or the impact of the collision that is determined by the collision determination unit 92. By the above structure, the appropriate reaction force can be applied to the air bag 16 in accordance with the impact of the collision or the size of the vehicle occupant.

As illustrated in FIG. 13, the first strap 110 is connected to the first spring 142 corresponding to the energy absorption member, and the second strap 112 is connected to the second spring 144 corresponding to the energy absorption member. By the above structure, the force applied to the vehicle occupant from the air bag can be reduced.

Figure 14:
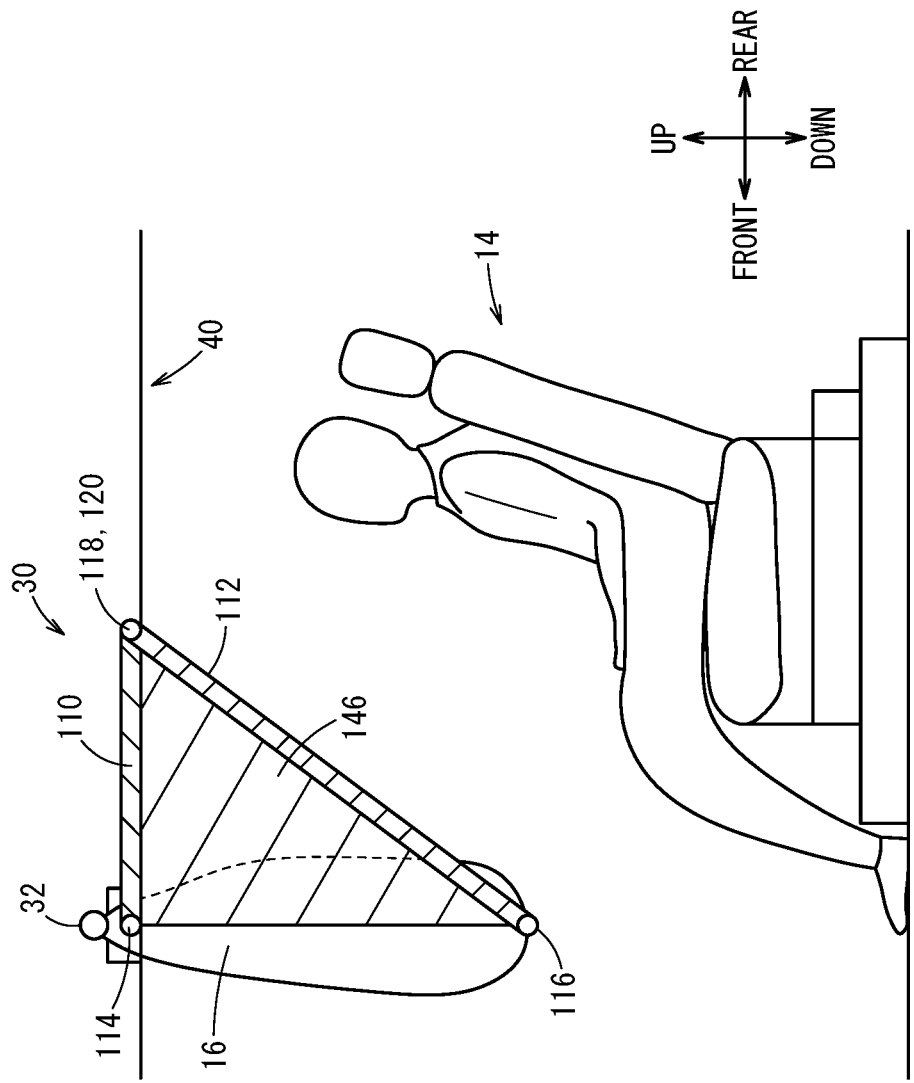
FIG. 14 is a schematic diagram of a fifth embodiment regarding straps as the reaction force applying mechanism.

As illustrated in FIG. 14, the vehicle occupant protection device 60 includes the sheet member 146 configured to extend between the second strap 112 and the roof 40. By the above structure, if the vehicle occupant moves toward the second strap 112, the vehicle occupant can be supported by the sheet member 146 in addition to the second strap 112. Thus, the force applied to the vehicle occupant from the second strap 112 can be reduced.

The vehicle occupant protection device 60 includes: the timer 104 configured to start the time measuring when the air bag 16 starts to be deployed; the strap cutting device 108 configured to cut the first strap 110 and the second strap 112 from the roof 40 in accordance with the cutting instruction; and the cutting instruction unit 100 configured to output the cutting instruction to the strap cutting device 108 if the time measured by the timer 104 has exceeded the predetermined time. By the above structure, after the predetermined time has passed, the vehicle occupant can move smoothly.

As illustrated in FIG. 18, the vehicle occupant protection device 60 includes: the rail 20 (seat support mechanism) configured to support the base 22 of the seat 14 in the state where the base 22 of the seat 14 is movable in the horizontal direction; and the air bag movement device 109 configured to move the air bag 16 in accordance with the movement operation of the base 22 of the seat 14. By the above structure, the deployment area of the air bag 16 can be set at the appropriate position in accordance with the position of the seat 14.

As illustrated in FIG. 17, the vehicle occupant protection device 60 includes the monitor device 148 protruding from the roof 40 in the downward direction of the vehicle 10. When the air bag 16 is deployed, the air bag 16 is disposed at a position where the air bag 16 is in contact with the monitor device 148. By the above structure, the monitor device 148 can apply the reaction force to the air bag 16.

The invention claimed is:

1. A vehicle occupant protection device comprising:
   an air bag configured to be deployed between two seats that are adjacent to each other;
   a deployment control unit configured to deploy the air bag;
   a seat disposition determination unit configured to determine directions of the two seats; and
   a collision determination unit configured to determine information about a collision of a vehicle,
   wherein if the direction of one of the seats and the direction of another of the seats that are determined by the seat disposition determination unit face each other, and if a direction of the collision that is determined by the collision determination unit is on a front side of the one seat or a front side of the other seat, the deployment control unit deploys the air bag.

2. The vehicle occupant protection device according to claim 1, wherein the air bag is configured to be deployed from a roof in a downward direction of the vehicle.

3. The vehicle occupant protection device according to claim 2, further comprising a first strap and a second strap, each having one end fixed to the air bag and another end fixed to the roof,
   wherein a fixing part for the deployed air bag and the first strap is positioned above a fixing part for the deployed air bag and the second strap.

4. The vehicle occupant protection device according to claim 3, further comprising:
   a vehicle occupant determination unit configured to determine a physique of a vehicle occupant; and
   a tension control unit configured to control tensions of the first strap and the second strap on a basis of the physique of the vehicle occupant that is determined by the vehicle occupant determination unit and/or impact of the collision that is determined by the collision determination unit.

5. The vehicle occupant protection device according to claim 3, wherein at least one of the first strap and the second strap is connected to an energy absorption member.

6. The vehicle occupant protection device according to claim 3, further comprising a sheet member configured to extend between the second strap and the roof.

7. The vehicle occupant protection device according to claim 3, further comprising:
   a timer configured to start time measuring when the air bag starts to be deployed;
   a strap cutting device configured to cut the first strap and the second strap from the roof in accordance with a cutting instruction; and
   a cutting instruction unit configured to output the cutting instruction to the strap cutting device if a time measured by the timer has exceeded a predetermined time.

8. The vehicle occupant protection device according to claim 3, further comprising:
   a seat support mechanism configured to support the seat in a state where the seat is movable in a horizontal direction; and
   an air bag movement device configured to move the air bag in accordance with a movement operation of the seat.

9. The vehicle occupant protection device according to claim 2, further comprising a monitor device protruding from the roof in the downward direction of the vehicle,
   wherein when the air bag is deployed, the air bag is disposed at a position where the air bag is in contact with the monitor device.

10. The vehicle occupant protection device according to claim 1, wherein the air bag is configured to be deployed from a roof side rail or a pillar toward a center in a vehicle width direction.

11. A vehicle occupant protection device comprising:
    an air bag configured to be deployed between a rearmost seat in a vehicle compartment and a rear end of the vehicle compartment;
    a deployment control unit configured to deploy the air bag;
    a seat disposition determination unit configured to determine a direction of the seat; and
    a collision determination unit configured to determine information about a collision of a vehicle,
    wherein if the direction of the seat that is determined by the seat disposition determination unit is a rear direction of the vehicle, and if a direction of the collision that is determined by the collision determination unit is on a rear side of the vehicle, the deployment control unit deploys the air bag.

12. The vehicle occupant protection device according to claim 11, wherein the air bag is configured to be deployed from a roof in a downward direction of the vehicle.

13. The vehicle occupant protection device according to claim 12, further comprising a first strap and a second strap, each having one end fixed to the air bag and another end fixed to the roof,
    wherein a fixing part for the deployed air bag and the first strap is positioned above a fixing part for the deployed air bag and the second strap.

14. The vehicle occupant protection device according to claim 13, further comprising:
    a vehicle occupant determination unit configured to determine a physique of a vehicle occupant; and
    a tension control unit configured to control tensions of the first strap and the second strap on a basis of the physique of the vehicle occupant that is determined by the vehicle occupant determination unit and/or impact of the collision that is determined by the collision determination unit.

15. The vehicle occupant protection device according to claim 13, wherein at least one of the first strap and the second strap is connected to an energy absorption member.

16. The vehicle occupant protection device according to claim 13, further comprising a sheet member configured to extend between the second strap and the roof.

17. The vehicle occupant protection device according to claim 13, further comprising:
   a timer configured to start time measuring when the air bag starts to be deployed;
   a strap cutting device configured to cut the first strap and the second strap from the roof in accordance with a cutting instruction; and
   a cutting instruction unit configured to output the cutting instruction to the strap cutting device if a time measured by the timer has exceeded a predetermined time.

18. The vehicle occupant protection device according to claim 13, further comprising:
   a seat support mechanism configured to support the seat in a state where the seat is movable in a horizontal direction; and
   an air bag movement device configured to move the air bag in accordance with a movement operation of the seat.

19. The vehicle occupant protection device according to claim 12, further comprising a monitor device protruding from the roof in the downward direction of the vehicle,
   wherein when the air bag is deployed, the air bag is disposed at a position where the air bag is in contact with the monitor device.

20. The vehicle occupant protection device according to claim 11, wherein the air bag is configured to be deployed from a roof side rail or a pillar toward a center in a vehicle width direction.

\* \* \* \* \*

UNITED STATES PATENT AND TRADEMARK OFFICE
CERTIFICATE OF CORRECTION

PATENT NO. : 10,960,839 B2
APPLICATION NO. : 16/494077
DATED : March 30, 2021
INVENTOR(S) : Kazuo Imura et al.

Page 1 of 1

It is certified that error appears in the above-identified patent and that said Letters Patent is hereby corrected as shown below:

In the Specification

Column 9:
Delete Lines 33 through 44.

Column 9:
Insert the following paragraph between Line 56 and 57:
--When the process has advanced from step S12 to step S13, it is determined whether the vehicle occupant is seated on the seat 14 that faces in the rear direction. Here, the vehicle occupant determination unit 90 determines whether the vehicle occupant is seated on the seat 14 that faces in the rear direction on the basis of the image information from the vehicle inside camera 80 or the detection result from the seat weight sensor 82. If the vehicle occupant is seated on the seat 14 that faces in the rear direction (step S13: YES), the process advances to step S14. On the other hand, if the vehicle occupant is not seated on the seat 14 that faces in the rear direction (step S13: NO), the process ends.--
.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*